(12) United States Patent
Luo et al.

(10) Patent No.: US 12,703,660 B2
(45) Date of Patent: Aug. 11, 2026

(54) SYSTEMS AND METHODS RELATED TO PARTICLE DEPOSITION

(71) Applicant: Tengfei Luo, Granger, IN (US)

(72) Inventors: Tengfei Luo, Granger, IN (US); Eungkyu Lee, Yongin-si (KR); Seunghyun Moon, Mishawaka, IN (US)

(73) Assignee: Tengfei Luo, Granger, IN (US)

( * ) Notice: Subject to any disclaimer, the term of this patent is extended or adjusted under 35 U.S.C. 154(b) by 314 days.

(21) Appl. No.: 17/829,771

(22) Filed: Jun. 1, 2022

(65) Prior Publication Data

US 2022/0388898 A1 Dec. 8, 2022

Related U.S. Application Data

(60) Provisional application No. 63/195,293, filed on Jun. 1, 2021.

(51) Int. Cl.

*B05D 1/00* (2006.01)
*C03C 17/00* (2006.01)
*C03C 23/00* (2006.01)

(52) U.S. Cl.

CPC ........ *C03C 17/002* (2013.01); *C03C 23/0025* (2013.01)

(58) Field of Classification Search

CPC ...... C03C 17/002; C03C 23/0025; B05D 1/00
See application file for complete search history.

(56) References Cited

PUBLICATIONS

Lv et al., In Situ surface-enhanced raman spectroscopy for detecting microplastics and nanoplastics in aquatic environments, Science of the total environment 728, (2020), 138449, pp. 1-8 (Year: 2020).*
Zaytsev et al., Gas-Vapor interplay in plasmonic bubble shrinkage, J. Phys Chem 2020, 124, pp. 5861-5869 (Year: 2020).*
Fujii et al., Manipulation of single DNA using a micronanobubble formed by local laser heating on a Au-coated surface, Chem Lett, 2010, 39, pp. 92-93 (Year: 2010).*
Armon et al., Continuous Nanoparticle Assembly by a modulated photo-induced microbubble for fabrication of micrometric conductive patterns, ACS, Appl Mater Interfaces, 2017, 9, p. 44214-44221 (Year: 2017).*
Zhang. et al., "Direct Observation of the Release of Nanoplastics from Commercially Recycled Plastics with Correlative Raman Imaging and Scanning Electron Microscopy," ACS Nano, vol. 14, 2020, pp. 7920-7926. (Supporting Information).
Zhang. et al., "Light-Guided Surface Plasmonic Bubble Movement via Contact Line De-Pinning by In-Situ Deposited Plasmonic Nanoparticle Heating," ACS Appl. Mater. Interfaces, vol. 11, 2019, pp. 48525-48532.

(Continued)

*Primary Examiner* — Gordon Baldwin
*Assistant Examiner* — Mohammad Mayy
(74) *Attorney, Agent, or Firm* — BakerHostetler; Toni-Junell Herbert

(57) ABSTRACT

Systems and methods are disclosed for depositing particles on a substrate, the method comprising generating a thermal bubble on a surface of a substrate submerged in a medium having suspended particles such that the thermal bubble deposits the particles on the substrate; and deflating the thermal bubble such that the deposited particles are pulled toward a central position to form an island of particles.

15 Claims, 18 Drawing Sheets

(56) References Cited

PUBLICATIONS

Zhang. et al., "Light-Guided Surface Plasmonic Bubble Movement via Contact Line De-Pinning by In-Situ Deposited Plasmonic Nanoparticle Heating," ACS Appl. Mater. Interfaces, vol. 11, 2019, pp. 48525-48532. (Supporting Information).
Zhang. et al., "Optically Driven Gold Nanoparticles Seed Surface Bubble Nucleation in Plasmonic Suspension," Nano Lett., vol. 21, 2021, pp. 5485-5492.
Zhang. et al., "Optically Driven Gold Nanoparticles Seed Surface Bubble Nucleation in Plasmonic Suspension," Nano Lett., vol. 21, 2021, pp. 5485-5492. (Supporting information).
Zhang. et al., "SERS detection of microRNA biomarkers for cancer diagnosis using gold-coated paramagnetic nanoparticles to capture SERS-active gold nanoparticles," RSC Adv., vol. 7, 2017, pp. 52782-52793.
Zhang. et al., "Surface Bubble Growth in Plasmonic Nanoparticle Suspension," ACS Appl. Mater. Interfaces, vol. 12, 2020, pp. 26680-26687.
Zhang. et al., "Surface Bubble Growth in Plasmonic Nanoparticle Suspension," ACS Appl. Mater. Interfaces, vol. 12, 2020, pp. 26680-26687. (Supporting Information).
Zhao. et al., "Theory and experiment on particle trapping and manipulation via optothermally generated bubbles," Lab Chip, vol. 14, 2014, pp. 384-391.
Zhao. et al., "Theory and experiment on particle trapping and manipulation via optothermally generated bubbles," Lab Chip, vol. 14, 2014, pp. 384-391. (Supplementary Information).
Zheng. et al., "Accumulating microparticles and direct-writing micropatterns using a continuous-wave laser-induced vapor bubble," Lab Chip, vol. 11, 2011, pp. 3816-3820.
Zhou. et al., "Identification of polystyrene nanoplastics using surface enhanced Raman spectroscopy," Talanta, vol. 221, 2021, 6 pages.
Ahmed. et al., "The application of modified polyetheleneterphthalate (pet) nanofibers; characterization and isotherm study" The International Conference of Chemistry, 2020, vol. 1853, 16 pages.
Armon et al., "Continuous Nanoparticle Assembly by a modulated photo-induced microbubble for fabrication of micrometric conductive patterns", ACS, Appl Mater Interfaces, 2017, 9, pp. 44214-44221 (Supporting Information).
Baffou. et al., "Femtosecond-pulsed optical heating of gold nanoparticles," Physical Review B, vol. 84, 2011, 13 pages.
Baffou. et al., "Photoinduced Heating of Nanoparticle Arrays," Acs nano, vol. 7, No. 8, 2013, pp. 6478-6488.
Baffou. et al., "Photoinduced Heating of Nanoparticle Arrays," Acs nano, vol. 7, No. 8, 2013, pp. 6478-6488. (Supplementary Information).
Baffou. et al., "Super-heating and micro-bubble generation around plasmonic nanoparticles under cw illumination," The Journal of Physical Chemistry C, vol. 118, 2014, pp. 4890-4898.
Baffou. et al., "Super-heating and micro-bubble generation around plasmonic nanoparticles under cw illumination," The Journal of Physical Chemistry C, vol. 118, Issue 9, 2014, 1 page. (Supplementary Information).
Baigl., "Photo-actuation of liquids for light-driven microfluidics: state of the art and perspectives," Lab Chip, vol. 12, 2012, pp. 3637-3653.
Barbosa. et al., "A critical viewpoint on current issues, limitations, and future research needs on micro- and nanoplastic studies: From the detection to the toxicological assessment.," Environmental Research, vol. 182, 2020, 18 pages.
Boriskina. et al., "Plasmonic materials for energy: From physics to applications," Materials Today, vol. 16, No. 10, Oct. 2013, pp. 375-386.
Boulais. et al., "Plasma Mediated off-Resonance Plasmonic Enhanced Ultrafast Laser-Induced Nanocavitation," Nano Lett., vol. 12, 2012, pp. 4763-4769.
Boulais. et al., "Plasma Mediated off-Resonance Plasmonic Enhanced Ultrafast Laser-Induced Nanocavitation," Nano Lett., vol. 12, 2012, pp. 4763-4769. (supplementary information).
Castelvetro. et al., "Nylon 6 and nylon 6,6 micro- and nanoplastics: A first example of their accurate quantification, along with polyester (PET), in wastewater treatment plant sludges," Journal of Hazardous Materials, vol. 407, 2021, 9 pages.
Chan et al., "Quantum Dot Bioconjugates for Ultrasensitive Nonisotopic Detection." Science, vol. 281, Sep. 25, 1998, pp. 2016-2018.
Choi. et al., "Size-selective concentration and label-free characterization of protein aggregates using a Raman active nanofluidic device," Lab Chip, vol. 11, 2011, pp. 632-638.
Choi. et al., "Size-selective concentration and label-free characterization of protein aggregates using a Raman active nanofluidic device," Lab Chip, vol. 11, 2011, pp. 632-638. (Supplementary Information).
Chou. et al., "Nanofluidic Biosensing for -Amyloid Detection Using Surface Enhanced Raman Spectroscopy," Nano Letters, vol. 8, No. 6, 2008, pp. 1729-1735.
Chou. et al., "Nanofluidic Biosensing for-Amyloid Detection Using Surface Enhanced Raman Spectroscopy," Nano Letters, vol. 8, No. 6, 2008, pp. 1729-1735. (Supplementary methods).
Clapp. et al., "Forster Resonance Energy Transfer Investigations Using Quantum-Dot Fluorophores," Chem Phys Chem, vol. 7, 2006, pp. 47-57.
Courtene-Jones. et al., "Microplastic pollution identified in deep-sea water and ingested by benthic invertebrates in the Rockall Trough, North Atlantic Ocean," Environmental Pollution, vol. 231, 2017, pp. 271-280.
Courtene-Jones. et al., "Microplastic pollution identified in deep-sea water and ingested by benthic invertebrates in the Rockall Trough, North Atlantic Ocean," Environmental Pollution, vol. 231, 2017, pp. 271-280. (Supplementary Information).
Derraik. et al., "The pollution of the marine environment by plastic debris: a review," Marine Pollution Bulletin, vol. 44, 2002, pp. 842-852.
Detert. et al., "Transition in the growth mode of plasmonic bubbles in binary liquids," Soft Matter, vol. 18, 2022, pp. 4136-4145.
Dohnalkova. et al., "Imaging Hydrated Microbial Extracellular Polymers: Comparative Analysis by Electron Microscopy," Applied and Environmental Microbiology, vol. 77, No. 4, Feb. 2011, pp. 1254-1262.
Dohnalkova. et al., "Imaging Hydrated Microbial Extracellular Polymers: Comparative Analysis by Electron Microscopy," Applied and Environmental Microbiology, vol. 77, No. 4, Feb. 2011, pp. 1254-1262. (Supplemental Information).
Doyle. et al., "Plastic particles in coastal pelagic ecosystems of the Northeast Pacific ocean," Marine Environmental Research, vol. 71, 2011, pp. 41-52.
Eriksen. et al., "Microplastic pollution in the surface waters of the Laurentian Great Lakes," Marine Pollution Bulletin, vol. 77, 2013, pp. 177-182.
Escosura-Muñiz. et al., "A Nanochannel/Nanoparticle-Based Filtering and Sensing Platform for Direct Detection of a Cancer Biomarker in Blood," Small, vol. 7, No. 5, 2011, pp. 675-682.
Escosura-Muñiz. et al., "A Nanochannel/Nanoparticle-Based Filtering and Sensing Platform for Direct Detection of a Cancer Biomarker in Blood," Small, vol. 7, No. 5, 2011, pp. 675-682. (Supporting Information).
Ferreira. et al., "Nanoplastics and marine organisms: What has been studied?," Environmental Toxicology and Pharmacology, vol. 67, 2019, 7 pages.
Fu. et al., "Photoinduced nanobubble-driven superfast diffusion of nanoparticles imaged by 4D electron microscopy," Sci. Adv., vol. 3, 2017, 7 pages.
Fu. et al., "Photoinduced nanobubble-driven superfast diffusion of nanoparticles imaged by 4D electron microscopy," Sci. Adv., vol. 3, 2017, 7 pages. (Supplementary Materials).
Fujii. et al., "Fabrication and Placement of a Ring Structure of Nanoparticles by a Laser-Induced Micronanobubble on a Gold Surface," Langmuir, vol. 27, 2011, pp. 8605-8610.

(56) References Cited

PUBLICATIONS

Fujii. et al., "Fabrication and Placement of a Ring Structure of Nanoparticles by a Laser-Induced Micronanobubble on a Gold Surface," Langmuir, vol. 27, 2011, pp. 8605-8610. (Supporting Information).
Furlani. et al., "Analysis of pulsed laser plasmon-assisted photothermal heating and bubble generation at the nanoscale," Lab Chip, vol. 12, 2012, pp. 3707-3719.
Geyer. et al., "Production, use, and fate of all plastics ever made," Law Sci. Adv., vol. 3, 2017, 5 pages.
Geyer. et al., "Production, use, and fate of all plastics ever made," Law Sci. Adv., vol. 3, 2017, 5 pages. (Supplementary Materials).
Ghosh. et al., "Directed Self-Assembly Driven Mesoscale Lithography Using Laser-Induced and Manipulated Microbubbles: Complex Architectures and Diverse Applications," Nano Lett., vol. 21, 2021, pp. 10-25.
Gigault. et al., "Current opinion: What is a nanoplastic?," Environmental Pollution, vol. 235, 2018, pp. 1030-1034.
Gigault. et al., "Nanoplastics are neither microplastics nor engineered nanoparticles," Nature Nanotechnology, vol. 16, 2021, pp. 501-507.
Gillibert. et al., "Raman Tweezers for Small Microplastics and Nanoplastics Identification in Seawater," Environ. Sci. Technol, vol. 53, 2019, pp. 9003-9013.
Gillibert. et al., "Raman Tweezers for Small Microplastics and Nanoplastics Identification in Seawater," Environ. Sci. Technol, vol. 53, 2019, pp. 9003-9013. (Supporting Information).
Gubala. et al., "Point of Care Diagnostics: Status and Future," Anal. Chem, vol. 84, 2012, pp. 487-515.
Halle. et al., "Nanoplastic in the North Atlantic Subtropical Gyre," Environ. Sci. Technol., vol. 51, 2017, pp. 13689-13697.
Hao. et al., "The mechanics of gas-vapor bubbles," Phys. Rev. Fluids, vol. 2, Issue 3, 2017 , 30 pages.
Ho. et al., "Evaluating the intracellular stability and unpacking of DNA nanocomplexes by quantum dots-FRET," Journal of Controlled Release, vol. 116, 2006, pp. 83-89.
Hoang. et al., "Microplastic consumption and excretion by fathead minnows (*Pimephales promelas*): Influence of particles size and body shape of fish," Science of the Total Environment, vol. 704, 2020, 9 pages.
Howes. et al., "Colloidal nanoparticles as advanced biological sensors," SCIENCE, vol. 346, Issue 6205, 2014, 11 pages.
Hu. et al., "Investigation of the properties of gold nanoparticles in aqueous solution at extremely high lattice temperatures," Chemical Physics Letters, vol. 391, 2004, pp. 220-225.
Huang. et al., "Enzyme- and label-free amplified fluorescence DNA detection using hairpin probes and SYBR Green I," Sensors and Actuators B, vol. 200, 2014, pp. 117-122.
Namura. et al., "Quasi-stokeslet induced by thermoplasmonic Marangoni effect around a water vapor microbubble," Scientific reports, vol. 7, Issue 1, 2017, 8 pages. (Supplementary information).
Nguyen. et al., "Study of Heat Transfer Dynamics from Gold Nanorods to the Environment via Time-Resolved Infrared Spectroscopy," ACS Nano, vol. 10, 2016, pp. 2144-2151.
Nguyen. et al., "Study of Heat Transfer Dynamics from Gold Nanorods to the Environment via Time-Resolved Infrared Spectroscopy," ACS Nano, vol. 10, 2016, pp. 2144-2151. (Supplementary Information).
Nishimura. et al., "Control of Submillimeter Phase Transition by Collective Photothermal Effect," J. Phys. Chem. C, vol. 118, 2014, pp. 18799-18804.
Nishimura. et al., "Control of Submillimeter Phase Transition by Collective Photothermal Effect," J. Phys. Chem. C, vol. 118, 2014, pp. 18799-18804. (Supporting Information).
Ong, et al., "Surface chemistry mediates thermal transport in three-dimensional nanocrystal arrays." Nature materials, vol. 12, Issue 5, May 2013, pp. 410-415.
Ong, et al., "Surface chemistry mediates thermal transport in three-dimensional nanocrystal arrays." Nature materials, vol. 12, Issue 5, May 2013, pp. 410-415. (supplementary information).
Oriekhova. et al., "Heteroaggregation of nanoplastic particles in the presence of inorganic colloids and natural organic matter," Environ. Sci.: Nano, vol. 5, 2018, pp. 792-799.
Owczarzy. et al., "IDT SciTools: a suite for analysis and design of nucleic acid oligomers," Nucleic Acids Research, vol. 36, 2008, pp. W163-W169.
Pang et al., "Solar-Thermal Water Evaporation: A Review." ACS Energy Lett., vol. 5, 2020, pp. 437-456.
Park, et al., "Combining dielectrophoresis and concentration polarization-based preconcentration to enhance bead-based immunoassay sensitivity." Nanoscale, vol. 11, Issue 19, 2019, pp. 9436-9443.
Park. et al., "A Solid State Nanopore Device for Investigating the Magnetic Properties of Magnetic Nanoparticles," Sensors, vol. 13, 2013, pp. 6900-6909.
Parker, et al., "Biomimetics of photonic nanostructures." Nature nanotechnology, vol. 2, Issue 6, Jun. 2007, pp. 347-353.
Paul. et al., "Micro- and nanoplastics—current state of knowledge with the focus on oral uptake and toxicity," Nanoscale Adv., vol. 2, 2020, pp. 4350-4367.
Peng. et al., "Micro- and nano-plastics in marine environment: Source, distribution and threats—A review," Science of the Total Environment, vol. 698, 2020, 12 pages.
Pistillo. et al., "PRAP-CVD: how to design high conformal PEDOT surfaces," RSC Adv., vol. 7, 2017, pp. 19117-19123.
Qin. et al., "Thermophysical and biological responses of gold nanoparticle laser heating," Chem. Soc. Rev., vol. 41, 2012, pp. 1191-1217.
Rabani. et al., "Drying-mediated self-assembly of nanoparticles," Nature, vol. 426, 2003, pp. 271-274.
Schmidt. et al., "Export of Plastic Debris by Rivers into the Sea," Environ. Sci. Technol, vol. 51, 2017, p. 12246-12253.
Seeley. et al., "Previous successes and untapped potential of pyrolysis-GC/MS for the analysis of plastic pollution," Analytical and Bioanalytical Chemistry, vol. 415, 2023, pp. 2873-2890.
Setoura. et al., "Observation of Nanoscale Cooling Effects by Substrates and the Surrounding Media for Single Gold Nanoparticles under CW-Laser Illumination," ACS NANO, vol. 7, No. 9, 2013, pp. 7874-7885.
Setoura. et al., "Observation of Nanoscale Cooling Effects by Substrates and the Surrounding Media for Single Gold Nanoparticles under CW-Laser Illumination," ACS NANO, vol. 7, No. 9, 2013, pp. 7874-7885. (Supporting Information).
Setoura. et al., "Stationary bubble formation and Marangoni convection induced by CW laser heating of a single gold nanoparticle," Nanoscale, vol. 9, 2017, pp. 719-730.
Setoura. et al., "Stationary bubble formation and Marangoni convection induced by CW laser heating of a single gold nanoparticle," Nanoscale, vol. 9, 2017, pp. 719-730. (Supplementary Information).
Sokmen. et al., "Polystyrene nanoplastics (20 nm) are able to bioaccumulate and cause oxidative DNA damages in the brain tissue of zebrafish embryo (*Danio rerio*)," Neurotoxicology, vol. 77, 2020, pp. 51-59.
Stiles. et al., "Surface-Enhanced Raman Spectroscopy," Annu. Rev. Anal. Chem, vol. 1, 2008, pp. 601-626.
Storhoff. et al., "One-Pot Colorimetric Differentiation of Polynucleotides with Single Base Imperfections Using Gold Nanoparticle Probes," J. Am. Chem. Soc, vol. 120, 1998, pp. 1959-1964.
Stuart., "Polymer crystallinity studied using Raman spectroscopy," Vibrational Spectroscopy, vol. 10, 1996, pp. 79-87.
Suh. et al., "Surface-Enhanced Raman Scattering as a Probe of Surface Geometry Effects on the Polymerization of Acrylic Acid on Silver," J. Phys. Chem., vol. 91, 1987, pp. 598-600.
Tao et al., "Solar-driven interfacial evaporation." Nature Energy, vol. 3, Dec. 2018, pp. 1031-1041.
Toussaint. et al., "Review of micro- and nanoplastic contamination in the food chain," Food Additives & Contaminants: Part A, vol. 36, No. 5, 2019, pp. 639-673.
Uurasjarvi. et al., "Microplastics accumulate to thin layers in the stratified Baltic Sea," Environmental Pollution, vol. 268, 2021, 9 pages.
Uurasjarvi. et al., "Microplastics accumulate to thin layers in the stratified Baltic Sea," Environmental Pollution, vol. 268, 2021, 9 pages. (Supplementary Information).

(56) References Cited

PUBLICATIONS

Uwada. et al., "Glycine Crystallization in Solution by CW Laser-Induced Microbubble on Gold Thin Film Surface," ACS Appl. Mater. Interfaces, vol. 4, 2012, pp. 1158-1163.
Uwada. et al., "Glycine Crystallization in Solution by CW Laser-Induced Microbubble on Gold Thin Film Surface," ACS Appl. Mater. Interfaces, vol. 4, 2012, pp. 1158-1163. (Supporting Information).
Wang et al., "Fluorescence Resonant Energy Transfer Biosensor Based on Upconversion-Luminescent Nanoparticles." Angew. Chem. Int. Ed., vol. 44, 2005, pp. 6054-6057.
Wang et al., "Fluorescence Resonant Energy Transfer Biosensor Based on Upconversion-Luminescent Nanoparticles." Angew. Chem. Int. Ed., vol. 44, 2005, pp. 6054-6057. (Supporting Information).
Wang. et al., "In-situ and real-time nano/microplastic coatings and dynamics in water using nano-DIHM: A novel capability for the plastic life cycle research," Water Research, vol. 235, 2023, 10 pages.
Wang. et al., "In-situ and real-time nano/microplastic coatings and dynamics in water using nano-DIHM: A novel capability for the plastic life cycle research," Water Research, vol. 235, 2023, 10 pages. (Supporting Information).
Wang. et al., "Label-Free SERS Selective Detection of Dopamine and Serotonin Using Graphene-Au Nanopyramid Heterostructure," Anal. Chem, vol. 87, 2015, pp. 10255-10261.
Wang. et al., "Label-Free SERS Selective Detection of Dopamine and Serotonin Using Graphene-Au Nanopyramid Heterostructure," Anal. Chem, vol. 87, 2015, pp. 10255-10261. (Supporting Information).
Weiss. et al., "The missing ocean plastic sink: Gone with the rivers," Science, vol. 373, 2011, pp. 107-111.
Weiss. et al., "The missing ocean plastic sink: Gone with the rivers," Science, vol. 373, 2011, pp. 107-111. (Supplementary Materials).
Xie. et al., "Optothermally generated surface bubble and its applications," Nanoscale, vol. 9, Issue 20, 2017, pp. 6622-6631.
Yamamoto. et al., "Development of a rapid bacterial counting method based on photothermal assembling," Optical Materials Express, vol. 6, Issue 4, 2016, pp. 1280-1285.
Yamamoto. et al., "Surfactant-Controlled Photothermal Assembly of Nanoparticles and Microparticles for Rapid Concentration Measurement of Microbes," ACS Appl. Bio Mater, vol. 2, 2019, pp. 1561-1568.
Yamamoto. et al., "Surfactant-Controlled Photothermal Assembly of Nanoparticles and Microparticles for Rapid Concentration Measurement of Microbes," ACS Appl. Bio Mater, vol. 2, 2019, pp. 1561-1568. (Supporting Information).
Yang. et al., "lonovoltaic urea sensor," Nano Energy, vol. 57, 2019, pp. 195-201.
Zaytsev. et al., "Gas-vapor interplay in plasmonic bubble shrinkage," The Journal of Physical Chemistry C, vol. 124, Issue 10, 2020, 7 pages. (Supporting Information).
Zhang. et al., "Direct Observation of the Release of Nanoplastics from Commercially Recycled Plastics with Correlative Raman Imaging and Scanning Electron Microscopy," ACS Nano, vol. 14, 2020, pp. 7920-7926.
Huang. et al., "Enzyme-and label-free amplified fluorescence DNA detection using hairpin probes and SYBR Green I," Sensors and Actuators B, vol. 200, 2014, pp. 117-122. (Supporting Information).
Huck. et al., "Three-Dimensional Dispersion of Neutral "Plastic" Particles in a Global Ocean Model," Frontiers in Analytical Science, vol. 2, 2022, 14 pages.
Hurst. et al., "Maximizing DNA Loading on a Range of Gold Nanoparticle Sizes," Anal. Chem, vol. 78, 2006, pp. 8313-8318.
Hurst. et al., "Maximizing DNA Loading on a Range of Gold Nanoparticle Sizes," Anal. Chem, vol. 78, 2006, pp. 8313-8318. (Supporting Information).
Jeong. et al., "Microplastic Size-Dependent Toxicity, Oxidative Stress Induction, and p-JNK and p-p38 Activation in the Monogonont Rotifer (*Brachionus koreanus*)," Environ. Sci. Technol, vol. 50, 2016, pp. 8849-8857.
Jeong. et al., "Microplastic Size-Dependent Toxicity, Oxidative Stress Induction, and p-JNK and p-p38 Activation in the Monogonont Rotifer (*Brachionus koreanus*)," Environ. Sci. Technol, vol. 50, 2016, pp. 8849-8857. (Supporting Information).
Jeong. et al., "Nanoplastic Ingestion Enhances Toxicity of Persistent Organic Pollutants (POPs) in the Monogonont Rotifer Brachionus koreanus via Multixenobiotic Resistance (MXR) Disruption," Environ. Sci. Technol, vol. 52, 2018, pp. 11411-11418.
Kang. et al., "Surface-enhanced Raman scattering via entrapment of colloidal plasmonic nanocrystals by laser generated microbubble on random gold nano-islands," Nanoscale, vol. 8, Issue 19, 2016, pp. 10266-10272.
Kim. et al., "Fabrication of plasmonic arrays of nanodisks and nanotriangles by nanotip indentation lithography and their optical properties," Nanoscale, vol. 13, 2021, pp. 4475-4484.
Kim. et al., "Fabrication of plasmonic arrays of nanodisks and nanotriangles by nanotip indentation lithography and their optical properties," Nanoscale, vol. 13, 2021, pp. 4475-4484. (Supplementary Information).
Kim. et al., "Langmuir-Blodgett Nanorod Assembly," J. Am. Chem. Soc, vol. 123, 2001, pp. 4360-4361.
Kim. et al., "Multivalent Traptavidin-DNA Conjugates for the Programmable Assembly of Nanostructures," ACS Nano, vol. 13, 2019, pp. 1183-1194.
Kim. et al., "Multivalent Traptavidin-DNA Conjugates for the Programmable Assembly of Nanostructures," ACS Nano, vol. 13, 2019, pp. 1183-1194. (Supporting Information).
Kooi. et al., "Ups and Downs in the Ocean: Effects of Biofouling on Vertical Transport of Microplastics," Environ. Sci. Technol, vol. 51, 2017, pp. 7963-7971.
Kooi. et al., "Ups and Downs in the Ocean: Effects of Biofouling on Vertical Transport of Microplastics," Environ. Sci. Technol, vol. 51, 2017, pp. 7963-7971. (Supporting Information).
Korte. et al., "Formation of microbumps and nanojets on gold targets by femtosecond laser pulses," Appl. Phys. A, vol. 79, 2004, pp. 879-881.
Kwon. et al., "Regional distribution of styrene analogues generated from polystyrene degradation along the coastlines of the North-East Pacific Ocean and Hawaii," Environmental Pollution, vol. 188, 2014, pp. 45-49.
Lambert. et al., "Characterisation of nanoplastics during the degradation of polystyrene," Chemosphere, vol. 145, 2016, pp. 265-268.
Lapotko., "Plasmonic nanoparticle-generated photothermal bubbles and their biomedical applications", Nanomedicine, vol. 4, Issue 7, 2009, pp. 813-845.
Law. et al., "Plastic Accumulation in the North Atlantic Subtropical Gyre," Science, vol. 329, 2010, pp. 1185-1188.
Law. et al., "Plastic Accumulation in the North Atlantic Subtropical Gyre," Science, vol. 329, 2010, pp. 1185-1188. (Supporting Material).
Lee. et al., "Ballistic supercavitating nanoparticles driven by single Gaussian beam optical pushing and pulling forces," Nature Communications, 2020, 8 pages.
Lee. et al., "Ballistic supercavitating nanoparticles driven by single Gaussian beam optical pushing and pulling forces," Nature Communications, 2020, 8 pages. (Supplementary Information).
Li. et al., "A shear-enhanced CNT-assembly nanosensor platform for ultra-sensitive and selective protein detection," Biosensors and Bioelectronics, vol. 97, 2017, pp. 143-149.
Li. et al., "Evaluating the Occurrence of Polystyrene Nanoparticles in Environmental Waters by Agglomeration with Alkylated Ferroferric Oxide Followed by Micropore Membrane Filtration Collection and Py-GC/MS Analysis," Environ. Sci. Technol., vol. 56, 2022, pp. 8255-8265.
Li. et al., "Evaluating the Occurrence of Polystyrene Nanoparticles in Environmental Waters by Agglomeration with Alkylated Ferroferric Oxide Followed by Micropore Membrane Filtration Collection and Py-GC/MS Analysis," Environ. Sci. Technol., vol. 56, 2022, pp. 8255-8265. (Supporting Information).
Li. et al., "Interactions between nano/micro plastics and suspended sediment in water: Implications on aggregation and settling," Water Research, vol. 161, 2019, pp. 486-495.

(56) References Cited

PUBLICATIONS

Li. et al., "Interactions between nano/micro plastics and suspended sediment in water: Implications on aggregation and settling," Water Research, vol. 161, 2019, pp. 486-495. (Supporting Information).
Li. et al., "Sequential Isolation of Microplastics and Nanoplastics in Environmental Waters by Membrane Filtration, Followed by Cloud-Point Extraction," Anal. Chem, vol. 93, 2021, pp. 4559-4566.
Li. et al., "Sequential Isolation of Microplastics and Nanoplastics in Environmental Waters by Membrane Filtration, Followed by Cloud-Point Extraction," Anal. Chem, vol. 93, 2021, pp. 4559-4566. (Supporting Information).
Lin. et al., "Bubble-Pen Lithography," Nano letters, vol. 16, Issue 1, 2016, pp. 701-708.
Lin. et al., "Bubble-Pen Lithography," Nano letters, vol. 16, Issue 1, 2016, pp. 701-708. (Supplementary Information).
Lukianova-Hleb. et al., "Laser Pulse Duration Is Critical For the Generation of Plasmonic Nanobubbles," Langmuir, vol. 30, 2014, pp. 7425-7434.
Lustig, et al. "Metal-organic frameworks: functional luminescent and photonic materials for sensing applications." Chemical Society Reviews, vol. 46, Issue 11, 2017, pp. 3242-3285.
Materic. et al., "Nanoplastics measurements in Northern and Southern polar ice," Environmental Research, vol. 208, 2022, 11 pages.
Mattsson. et al., "Brain damage and behavioural disorders in fish induced by plastic nanoparticles delivered through the food chain," Scientific Reports, vol. 7, 2017, 7 pages.
Mattsson. et al., "Brain damage and behavioural disorders in fish induced by plastic nanoparticles delivered through the food chain," Scientific Reports, vol. 7, 2017, 7 pages. (Supplementary Information).
McCormick. et al., "Microplastic is an Abundant and Distinct Microbial Habitat in an Urban River," Environ. Sci. Technol., vol. 48, 2014, pp. 11863-11871.
Miller. et al., "Forensic Analysis of Single Fibers by Raman Spectroscopy," Applied spectroscopy, vol. 55, Issue 12, 2001, pp. 1729-1732.
Mintenig. et al., "Identification of microplastic in effluents of waste water treatment plants using focal plane array- based micro-Fourier-transform infrared imaging," Water Research, vol. 108, 2017, pp. 365-372.
Mintenig. et al., "Identification of microplastic in effluents of waste water treatment plants using focal plane array- based micro-Fourier-transform infrared imaging," Water Research, vol. 108, 2017, pp. 365-372. (Supplementary material).
Mitrano. et al., "Placing nanoplastics in the context of global plastic pollution," Nature Nanotechnology, vol. 16, 2021, pp. 491-500.
Moon. et al., "Biocompatible Direct Deposition of Functionalized Nanoparticles Using Shrinking Surface Plasmonic Bubble," Adv. Mater. Interfaces, vol. 7, 2020, 8 pages.
Moon. et al., "Biocompatible Direct Deposition of Functionalized Nanoparticles Using Shrinking Surface Plasmonic Bubble," Adv. Mater. Interfaces, vol. 7, 2020, 8 pages. (Supporting Information).
Moon. et al., "Plasmonic Nanobubbles-A Perspective," J. Phys. Chem. C, vol. 125, 2021, pp. 25357-25368.
Moore. et al., "A comparison of neustonic plastic and zooplankton abundance in southern California's coastal waters," Marine Pollution Bulletin, vol. 44, 2002, pp. 1035-1038.
Namura. et al., "Direction control of quasi-stokeslet induced by thermoplasmonic heating of a water vapor microbubble," Scientific Reports, vol. 9, 2019, 9 pages.
Namura. et al., "Direction control of quasi-stokeslet induced by thermoplasmonic heating of a water vapor microbubble," Scientific Reports, vol. 9, 2019, 9 pages. (Supplementary information).
Namura. et al., "Photothermally controlled Marangoni flow around a micro bubble," Applied Physics Letters, vol. 106, 2015, 6 pages.
Namura. et al., "Quasi-stokeslet induced by thermoplasmonic Marangoni effect around a water vapor microbubble," Scientific reports, vol. 7, Issue 1, 2017, 8 pages.

* cited by examiner

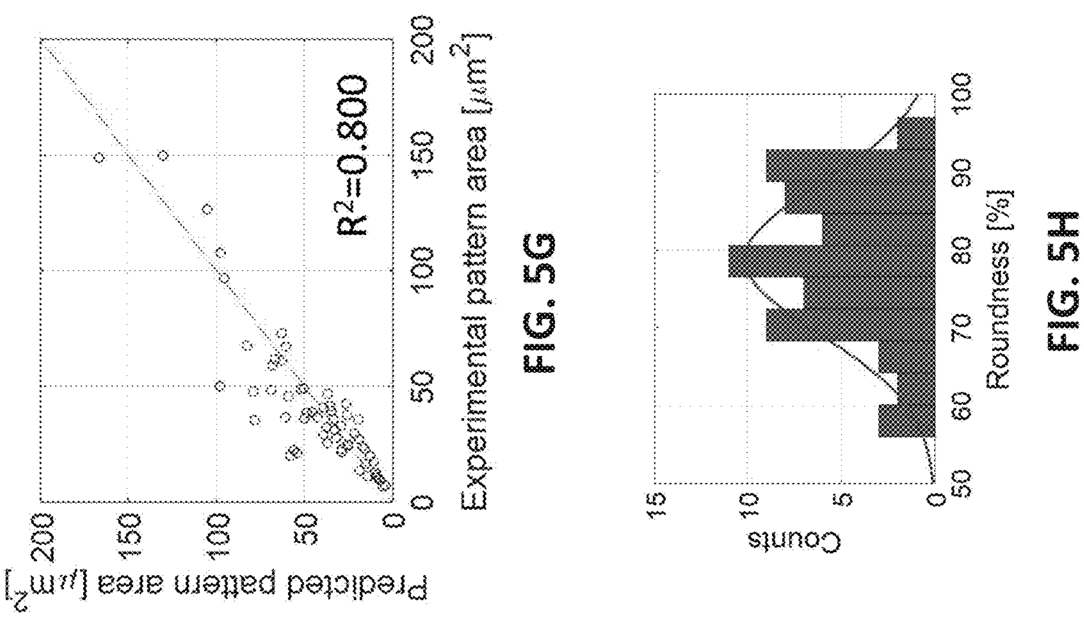
FIG. 5G
FIG. 5H
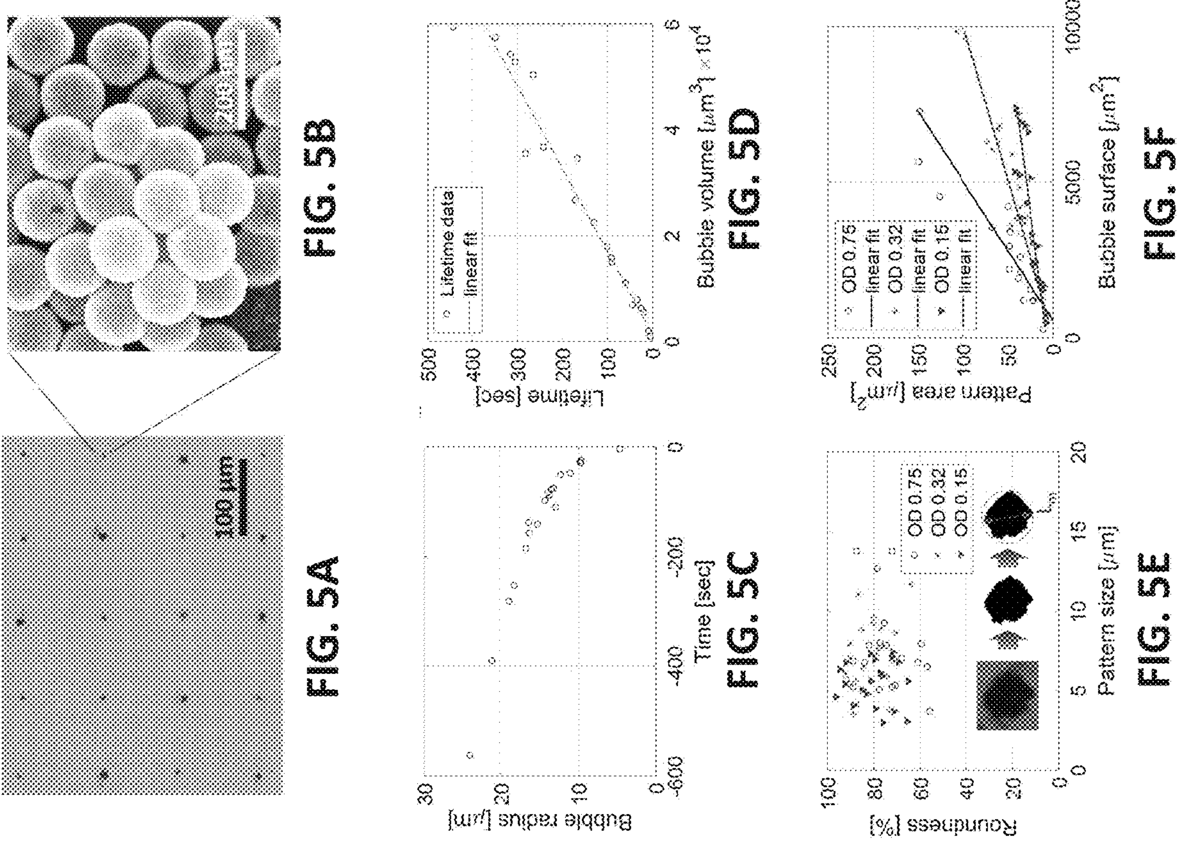
FIG. 5A
FIG. 5B
FIG. 5C
FIG. 5D
FIG. 5E
FIG. 5F

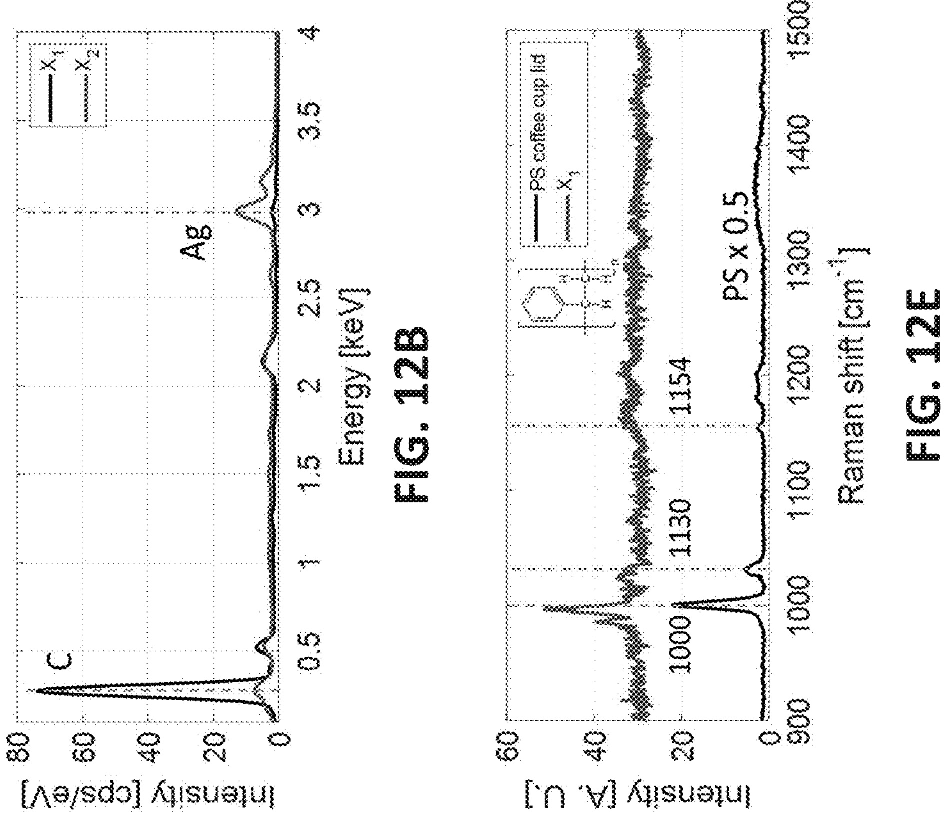
FIG. 12B
FIG. 12E
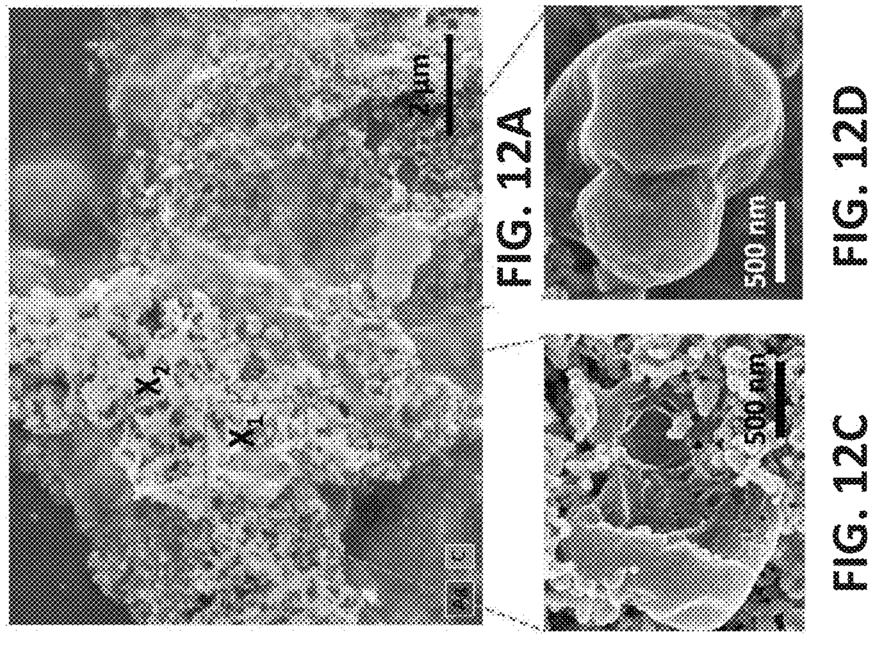
FIG. 12A
FIG. 12C
FIG. 12D

SYSTEMS AND METHODS RELATED TO PARTICLE DEPOSITION

CROSS REFERENCE TO RELATED APPLICATIONS

This application claims the benefit of U.S. Provisional Application No. 63/195,293 filed Jun. 1, 2021, the entire disclosure of which is hereby incorporated herein by reference in its entirety.

GOVERNMENT RIGHTS

This invention was made with government support under Contract Nos. 1706039, 1903719, 1931850, 1937923, 2001079, and 2040565, awarded by the National Science Foundation and under Contract No. GA-2018-268 awarded by the Center for the Advancement of Science in Space. The government has certain rights in the invention.

DISQUALIFICATION OF ART

Moon, S., Zhang, Q., Huang, D., Senapati, S., Chang, H.-C., Lee, E., Luo, T., Biocompatible Direct Deposition of Functionalized Nanoparticles Using Shrinking Surface Plasmonic Bubble. *Adv. Mater. Interfaces* 2020, 7, 2000597 ("Moon et al.") is not prior art pursuant to 35 U.S.C. § 102(b)(1) as the subject matter disclosed was made by the inventor or joint inventor or by another who obtained the subject matter disclosed directly or indirectly from the inventor or a joint inventor as evidenced by a comparison of the text of U.S. Provisional Application No. 63/195,293 and the text of Moon et al.

TECHNICAL FIELD

Embodiments of the present disclosure generally relate to the deposition of particles on a substrate, and products therefrom. Particular embodiments relate to deposition of particles on a substrate for sensing purposes.

SUMMARY

According to certain aspects of the present disclosure, methods are disclosed for depositing a number of particles onto a substrate.

Certain embodiments are directed to a method including generating a thermal bubble on a surface of a substrate submerged in a medium having suspended particles such that the thermal bubble deposits the particles on the substrate, and deflating the thermal bubble such that the deposited particles are pulled toward a central position to form an island of particles.

Other embodiments are directed to a product, having a substrate, and an array of discrete islands, comprising a plurality of particles modified with biological molecules, on the substrate.

Other embodiments are directed to a having a substrate and a discrete island, comprising a plurality of sensing enhancing particles and an analyte, on the substrate.

It is to be understood that both the foregoing general description and the following detailed description are exemplary only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5A is an image of an array of 20 micropatterns produced by SSBD using ssDNA-functionalized AuNP suspension with an optical density (OD) of 0.75 at 800 nm. The peak radii of the bubbles are tuned by controlling the laser illumination times (between 1~5 sec).

FIG. 5B is an SEM image of the deposited spot, showing highly concentrated and closely packed particles.

FIG. 5C is a plot of initial radii of bubbles vs. their shrinkage time.

FIG. 5D shows bubble lifetimes as a function of peak volume. The line fitting indicates that the lifetime shows power-three dependence.

FIG. 5E shows roundness of fabricated patterns as defined in Equation 4. Three different concentrations (OD of 0.75, 0.32 and 0.15 at 800 nm) of pre-functionalized particle solutions are studied. Inset illustrates how the pattern size ($L_m$) is defined, and the roundness is the ratio between the black area and the area of the peripheric circle (circle).

FIG. 5F shows the correlation between surface area of generated bubbles and SSBD-deposited pattern areas.

FIG. 5G shows a parity plot for pattern area predicted using Eq. S1.

FIG. 5H shows a roundness histogram and normal distribution curve that show the distribution of all data of OD 0.75, 0.32 and 0.15.

FIG. 12A is an EDX elemental map overlaid with the SEM image.

FIG. 12B is contrasting EDX spectra of two points respectively from carbon-rich and Ag reach regions.

FIG. 12C is an SEM image of a flake-like plastic particle.

FIG. 12D is an SEM image of a plastic particle with a neck.

FIG. 12E is a SERS spectrum obtained from the $X_1$ site in FIG. 12A compared against the Raman spectrum from a commercial coffee-cup lid. Wider spectra are presented in FIG. 16.

DETAILED DESCRIPTION OF ILLUSTRATIVE EMBODIMENTS

Figures 1A, 1B, 1C, 1D:
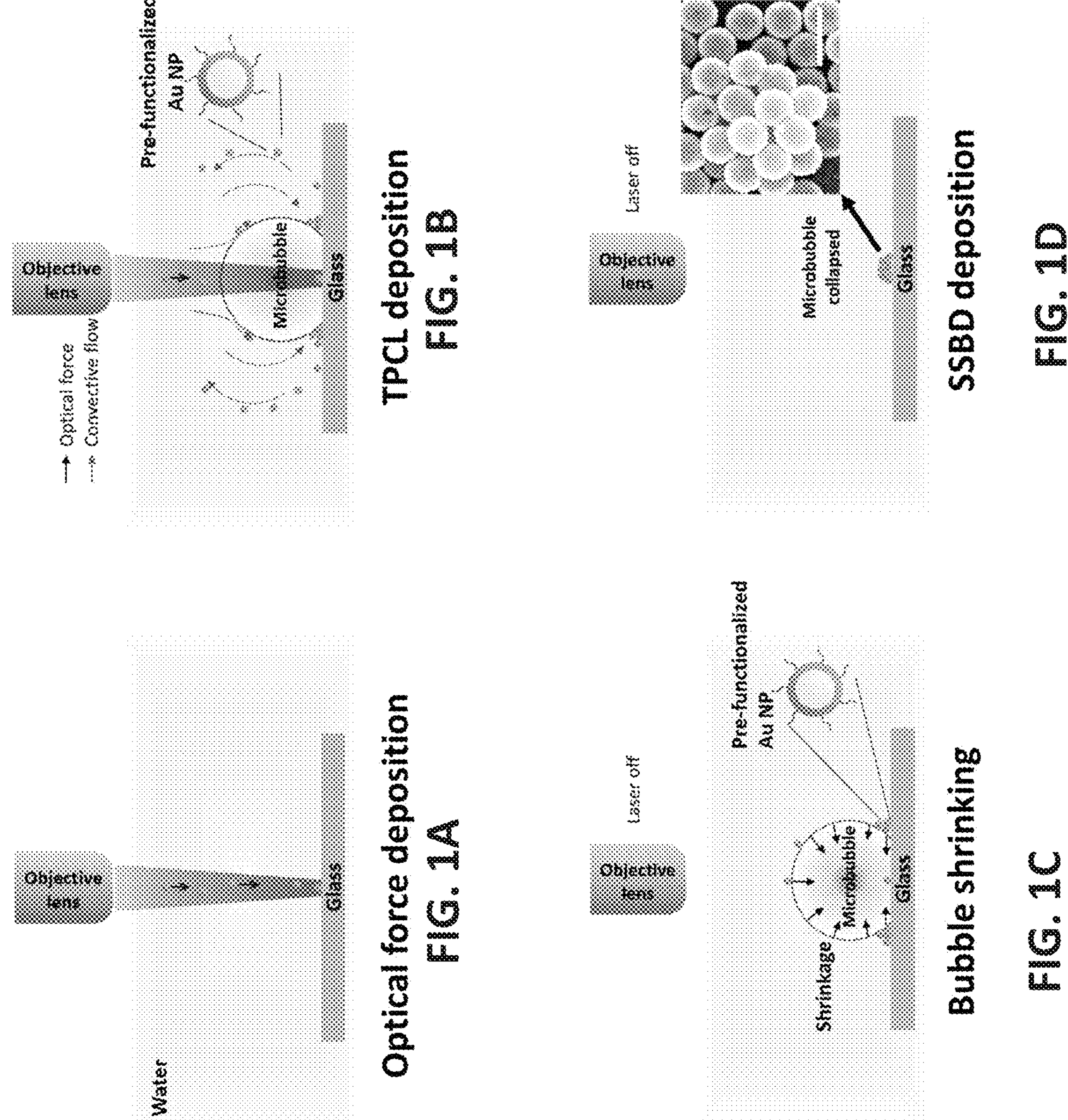
FIGS. 1A, 1B, 1C, and 1D show an illustration of one embodiment of Shrinking Surface Bubble Deposition including the steps of optical force deposition (FIG. 1A), TPCL deposition (FIG. 1B), bubble shrinking (FIG. 1C), and SSBD deposition (FIG. 1D).

Reference will now be made in detail to the embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps must be performed in the order presented but instead may be performed in a different order or parallel.

As used herein, the term "exemplary" is used in the sense of "example," rather than "ideal." Moreover, the terms "a" and "an" herein do not denote a limitation of quantity, but rather denote the presence of one or more of the referenced items.

The ability to manipulate nanoparticles (NPs) decorated by functional molecules, or particles in general, is important for a wide range of applications, such as photonics, nanocomposites, energy conversion, and biosensors. For example, advanced biosensing techniques, exemplified by quantum dot Förster resonance energy transfer (FRET) and surface enhanced Raman spectroscopy (SERS), are fundamentally based on the interaction between particles and functional molecules. Moreover, as point-of-care (POC) assays become increasingly demanded, diagnosis techniques based on miniaturized microfluidic chips with advanced sensors are being developed aimed at analyzing and quantifying small amounts of analytes. One challenge is that for nucleic acid sensors, exponential amplification reactions are usually required to make low target concentrations detectable, but these amplification reactions can be incompatible with POC assays due to the time-consuming nature and the requirement of sophisticated laboratory equipment. In addition, such reactions are not applicable to other targets like proteins, ions and lipids. A more generally applicable strategy is to concentrate targets in the analytes and deposit them onto a surface with pre-fabricated detectors. Depending on the sensing mechanism of a chip, fabrication processes using expensive equipment such as vacuum deposition, dry/wet etching and lithography may be required, which inevitably impose cost and throughput barriers for large scale applications.

Techniques using nanochannels, magnetic nanobeads, evaporative self-assembly, and Langmuir-Blodgett films have been explored to concentrate and deposit suspended particles to surfaces, but depositing them precisely to designated locations, which is important for applications like multiplex sensors, are still very challenging. In contrast, fluid flow around a photothermally generated surface bubble is a promising deposition method with precision.

One way of generating surface bubbles is through light absorption of metallic nanostructures fabricated on a surface. This can be accomplished with a spatially localized laser beam that is capable of heating-up the focal area so much that a vapor bubble is created and the temperature gradient around the bubble leads to a Marangoni flow. Such a flow near the bubble draws the particles in the suspension to the vapor-liquid interface acting as a trap to capture the particles. The flow eventually pushes the particles toward the three-phase contact line (TPCL) thereby depositing the particles on the surface. A TPCL occurs when a system is in steady state with three-phases (e.g., solid, liquid, and gas) and is motionless as there is an equilibrium of the tangential forces caused by the interfacial and surface tensions. This photothermal bubble deposition process can be used to deposit materials like polystyrene beads, quantum dots and noble metal nanoparticles in a medium.

As used herein, the term "medium" refers to a liquid. In certain embodiments the medium is an aqueous liquid. Other mediums include organic solvents.

As used herein, the term "particle" refers to solid particles which are suspensible in the given medium. In specific embodiments, the particles are metallic nanoparticles functionalized with DNA molecules or plastic particles. The particles can be nanoparticles: having a diameter between 1 nm and 1000 nm. The particles can also be microparticles: having a diameter between 1 μm and 1000 μm.

As used herein, the term "island" refers to particles deposited in a pile with high concentrations. In some embodiments, the height of the islands is on the order of 10 of nm to 10 μm. The lateral size of the islands can be on the order of 10 of μm. In general, islands can have any shape, e.g., an irregular shape, and islands can be defined as the product of particles on a substrate moving from a relatively low density to a relatively high density. In some embodiments, the density of the particles increases by more than 10×, e.g., 15×, 25×, 50×, 75×, 100×, 250×, 500×, 750×, and 1000×. In general, the density of particles increases between 10× and 1000×. The density increase can depend on the specific particle (e.g., size), medium, and size of the thermal bubble used.

In general, the medium contains one or more gasses dissolved therein. In one embodiment the gas is air. In other embodiments the medium can also contain other dissolvable gases.

As used herein, the term "biological molecule" refers to the class of molecules as known in the art. These molecules can be free-floating or attached molecules on the particle or on other constituents in the medium. In some embodiments the biological molecule is ssDNA.

Traditional bubble deposition involves using high-power lasers (~O(100) mW) and light-absorbing plasmonic structures to generate thermal bubbles. However, other methods of generating thermal bubbles are possible. For example, using a resistive heater on top, within, or below a substrate where deposition of the particles is desired. While the water temperature around the thermal bubbles under laser illumination is moderately high (~350 K), the laser covered area can have much higher temperatures. In addition, the suspended particles in the solution can experience intense heating and even supercavitation if the laser wavelength is at their surface plasmon resonance (SPR) peak, which would detach any functional molecules from the particles surface immediately. Nevertheless, the Marangoni flow and surface tension, especially at the TPCL, of the thermal bubbles have been studied for capturing and depositing biomarkers like DNA, proteins and microbes. However, to avoid damaging the biomolecules by the high temperature close to the laser-heated area, the size of the deposited region of biomarkers is usually a few times larger than the laser beam size, reducing the concentration ratio and thus sensing signal strength. The thermal problem involved in the thermal bubble deposition technique limits its application in direct deposition.

The present disclosure includes how a thermal bubble can be made compatible with the direct deposition of particles if the shrinking phase of the bubble is leveraged by turning off the heat, e.g., the photo excitation. This process is referred to as Shrinking Surface Bubble Deposition (SSBD). The SSBD technique demonstrated herein is useful and applicable to a wide range of applications, such as: detection of epidemic/pandemic infectious disease, cancers, chemical/biological weapons, etc.

Figure 1E:
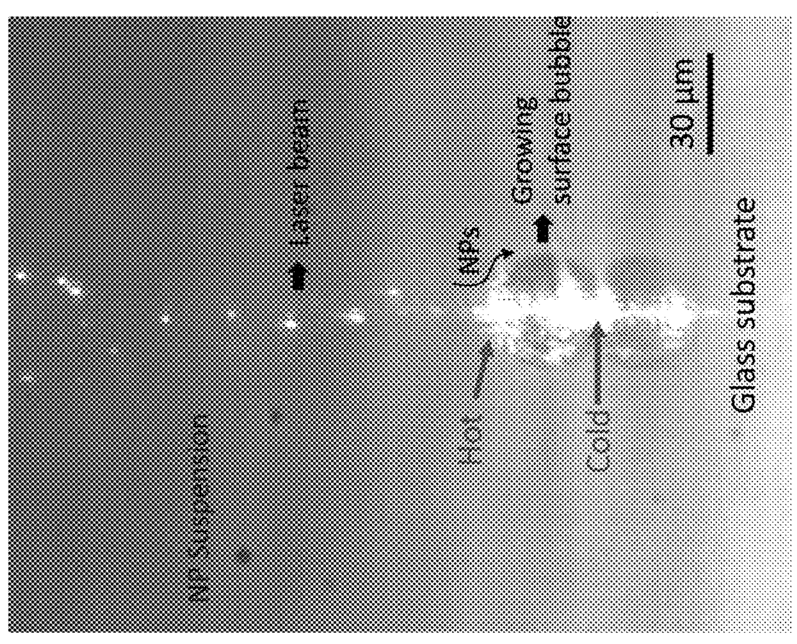
FIG. 1E shows an image of the growing surface bubble under laser illumination. In the functionalized Au particle suspension, the laser beam excites Au particles due to the plasmonic resonance that results in the volumetric heating of the laser-irradiated volume in the suspension. The flow of particles is toward the TPCL of the surface bubble.

As discussed above, particle movement and trapping around a thermal bubble is associated with factors like thermophoresis and convective flow. With respect to laser heating, the volume above the bubble can be hotter than the bottom due to plasmonic heating of the suspended particles. This is illustrated in FIG. 1E. Based on previous numerical studies and experimental results, the volumetric heating leads to a heat-capillary convection flow, as shown in FIG. 1E. This flow direction is different from other studies that used pre-defined nanostructures. The flow directions in the particle suspension is toward the TPCL of the surface bubble. This is evident by tracking the movement of the glowing dots, where the glowing dots (moving toward the surface bubble) correspond to the scattered light from the plasmonic Au particles. Here, the effects of volumetric heating and poor heat conductivity of gas inside the bubble were considered.

This temperature gradient forms a surface tension gradient along the bubble surface leading to a Marangoni flow around the bubble. This flow exerts drag force on the suspended particles and carries them towards the bubble surface. When the particles are brought to close proximity of the bubble, the competition between the surface tension and pressure difference captures and traps the particles at the bubble surface. The force due to surface tension pulls the particles towards the center of the bubble, while the force caused by the pressure difference at the bubble/water interface pushes the particles outward. Their balance causes the particles to be trapped. The Marangoni flow at the bubble surface would further drive the trapped particles to the TPCL. If the bubble is then detached from the surface, the trapped particles are deposited on the surface as a ring. This is the traditional mechanism of TPCL deposition using a steady state photothermal surface bubble.

However, in SSBD the bubble does not detach. Rather, heating is removed, e.g., the laser irradiation is turned off, after the bubble reaches a certain size. With the heat supply absent, the bubble, substrate and the surrounding liquid cool down, and the bubble starts to shrink. After the bubble eventually vanishes, a highly concentrated island with closely packed particles is deposited on the surface.

A general schematic of one embodiment of this process is provided in FIGS. 1A-D, as follows: (a) optical pressure force drives suspended particles to the surface; (b) laser-generated thermal bubble and the flow surrounding it drives suspended particles to the three-phase contact line (TPCL); (c) laser/heat source turned off to allow bubble shrinking which leads to TPCL contraction; and (d) concentrated particle island deposited by SSBD due to the complete contraction of TPCL as bubble vanishes. FIG. 1D inset is a representative scanning electron microscopy image of the SSBD spot (scale bar: 200 nm).

Figure 2A:
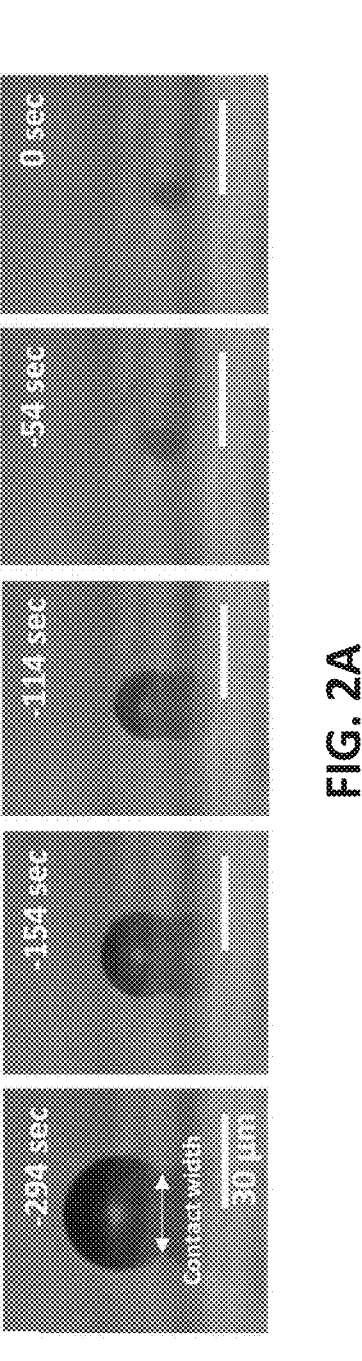
FIG. 2A is successive optical images from the side view of a typical shrinking bubble on the glass substrate.
Figure 2B:
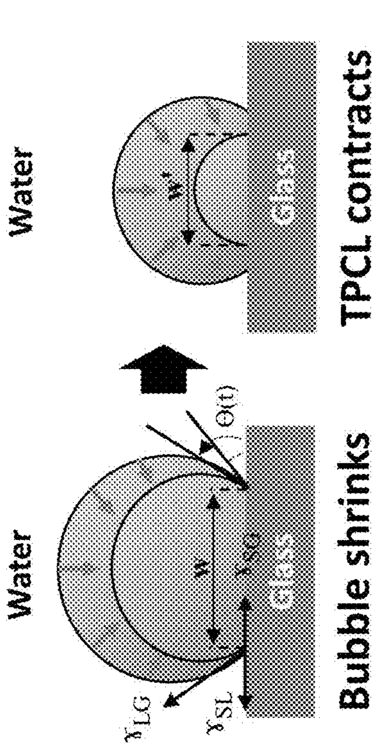
FIG. 2B is a schematic illustration of the contact line contraction during bubble shrinkage.

At least two stages in the shrinking of the surface bubble were observed, corresponding to vapor condensation and gas dissolving back to liquid water. The first stage is very fast, on the order of milliseconds. The second stage, gas molecules dissolving back to water, was found to dominate the shrinking process and the time scale can be on the order of hundreds of seconds. For instance, a bubble of 40 μm in diameter lasts about ~300 s before it eventually vanishes. FIG. 2A. Notably it was found that in the second stage, the bubble shrinkage is accompanied by the contact-line contraction. FIG. 2B. Here, the contact line (w) and the radius of surface bubble (a) are independent parameters. If the bubble collapses without contact line contraction, the particles adsorbed on the TPCL should have a ring shape when they are deposited. In the case of SSBD, the deposited site has a filled circular shape.

Figure 2C:
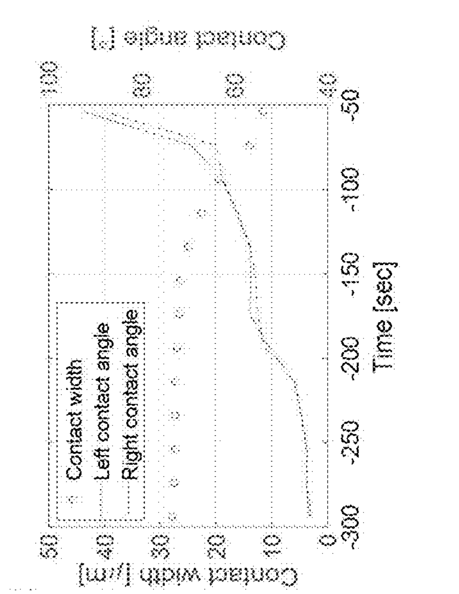
FIG. 2C shows the results of contact width and contact angle as a function of time during a bubble shrinking process experiment.

It has been found that the decrease in contact line width is not continuous. As illustrated schematically in FIG. 2B and shown quantitatively in FIG. C, the bubble initially maintains a nearly constant contact line width while the contact angle increases gradually. When the contact angle reaches a critical value, θ_cr (55±1° in the experimental results), the contact line width starts to decrease rapidly. This phenomenon can be further explained by analyzing the force balance at the TPCL via Young's equation:

$$\gamma_{SL}+\gamma_{LG}\cos\theta=\gamma_{SG},\ \text{for}\ \theta\leq\theta_{cr} \tag{1}$$

$$\gamma_{SL}+\gamma_{LG}\cos\theta<\gamma_{SG},\ \text{for}\ \theta>\theta_{cr} \tag{2}$$

where $\gamma_{SL}$, $\gamma_{LG}$ and $\gamma_{SG}$ represent the interface energy of solid-liquid, liquid-gas and solid-gas, respectively. FIG. 2C. The bubble tends to maintain a spherical shape. Therefore, when the surface bubble shrinks, the contact line should tend to contract to keep the bubble as spherical as possible. However, the contact line is pinned and thus the bubble becomes increasingly non-spherical (i.e., liquid-gas surface energy, $\gamma_{LG}$, increases), which leads the contact angle to increase and the surface tension of bubble to build up (Equation 1). This continues until the contact line can no longer be pinned by the pinning forces, which eventually leads to the contraction of the contact line (Equation 2). As shown in Equation 2, when the contact angle is larger than the critical angle on the hydrophilic substrate, $\gamma_{SG}$ becomes dominant. This leads to the contraction of the contact line (FIG. 2B) and the particles adsorbed on the TPCL are pulled inward.

Based on the discovered mechanism, the particles captured by the TCPL can be piled into a concentrated spot as the bubble shrinks to vanish. Moreover, the whole process can happen without laser heating. This maintains the viability of the heat sensitive molecules attached to the particles.

Laser Based Shrinking Surface Bubble Deposition (SSBD) and Sensing with Biological Molecules The applicability of SSBD technique for bio-sensing applications is demonstrated by directly depositing single-stranded DNA (ssDNA)-functionalized core-shell AuNPs onto a bare glass substrate.

In general, using NPs made of a silica-core (~100 nm in diameter) and a Au-shell (~10 nm in thickness) were used since they have a SPR peak (~785 nm) matching the wavelength of the excitation laser. See FIGS. 3D-E. The ssDNA was conjugated to the AuNP surface through the gold-sulfur bonding chemistry. FIG. 3A. To achieve this bonding, the ssDNA oligonucleotides were modified with thiol groups at the 3' end (Integrated DNA Technologies, Inc.), which binds to the gold surface according to the salt aging protocol. The ssDNA consists of 35 bases and 57.1% of GC content, and it is capable of folding so as to form a hairpin loop through complementary hydrogen bonding. FIG. 3A. The presence of this secondary structure (i.e., hairpin) at room temperature was beneficial for the detection purpose because it can provide a binding site of intercalating dyes, such as SYBR Green I (SG I), to confer fluorescence emission. SG I (Invitrogen) is a staining dye that specifically binds to double-stranded DNA and emits green fluorescence. The hairpin structure of our ssDNA provides such a binding site (FIG. 3A) as predicted using the IDT SciTools. The estimated free energy (ΔG) is −1.75 kcal/mole and the melting temperature ($T_m$) is 45.9° C. The spontaneous hairpin structures at room temperature were designed to observe florescence signals with SG I added, if the ssDNA survives the SSBD process. The viability of the ssDNA can be further verified by thermal cycling above the $T_m$, which will break the complementary hydrogen bonds to release the fluorescent dye that was intercalated at the hairpin loop, leading to a decrease in fluorescence intensity.

To further elucidate the mechanism behind the SSBD process, videography (30 frames/sec) was used to characterize the bubble shrinking process.

1. Preparation of Pre-Functionalized AuNP

Reduction of thiol-modified DNA was performed using Tris(2-carboxyethyl)phosphine hydrochloride (TCEP) (20 mM). Blending DNA with TCEP reduction agent, the solution was incubated at room temperature for 3 hours. The cleaved DNA was then purified by a NAP-5 column (illustra NAP Columns, GE Healthcare). The purified DNAs were injected to a core/shell AuNP solution (Auroshell, Nanospectra Biosciences, Inc., number density of $2\times10^9$/ml) containing 0.01 M phosphate buffer (PB) and 0.01% sodium dodecyl sulfate (SDS). The DNA and AuNPs solution was then incubated at room temperature for 20 min. Concentration of sodium chloride (NaCl) in the DNA/AuNPs solution was increased to 0.05 M by adding a NaCl stock solution (2 M). The solution was then sonicated for 10 sec and incubated for 20 min at room temperature. This process was repeated until the concentration of salt in the solution reached 1 M. The final solution was stored at room temperature for 30 hours. After the incubation step, the suspension containing salt and functionalized AuNPs was centrifuged and the supernatant was removed. The NPs were then resuspended in DI water. A total of 5 supernatant removals were carried out by repeating the washing process.

2. Optical Setup for Nanoparticle Deposition

An 800-nm femtosecond pulsed laser (linear polarized Gaussian beam) with a repetition rate of 80.7 MHz and a pulse duration of 200 fs was focused in the pre-functionalized NP suspension using a 20× objective lens with a numerical aperture of 0.42. 2 mL of functionalized AuNPs was dispersed in the cuvette. The length of the laser beam path in the cuvette was fixed at 4 mm using a PDMS holder. Commercial microscope slide glass (Superfrost® Plus Micro Slide, VWR international, LLC.) was used as a substrate for all experiments.

Directing the laser beam into the AuNP suspension, the optical pressure drove the irradiated particles toward the surface. Notably, the optical pressure-driven particle deposition allowed generation of surface bubbles without the need of pre-fabricated light absorbers. These deposited particles then acted as surface heaters as the particles continued to convert optical energy into thermal energy and further worked as a nucleation site for bubbles.

During experimentation, it was found that the time delay between laser irradiation and bubble nucleation was ~1 s when using a laser power density of ~8.8 mW/$\mu$m$^2$ at the focal plane, which overlaps with the surface of the substrate. The laser had a wavelength of 800 nm, which matches the SPR peak of the AuNP used in the experiment. With continued heating of the surface particles, the surface bubble grew due to both water vaporization and dissolved gas diffusion into the cavity.

3. Validation Test Using Intercalating Dye

SYBR™ Green I (10,000× concentrate in DMSO, Invitrogen) was diluted (1:50) with a phosphate buffered saline (PBS) 1× solution. The deposited patterns were stained using 100 μL of diluted SYBR solution for 20 min. After washing with PBS 4× solution and DI water, the patterns were immersed in a 100 μL of PBS 1× solution. Images were taken by an inverted fluorescence microscope (Eclipse Ti, Nikon). In the validation test, the pre-warmed PBS 1× solution was filled to remove the intercalating die from the DNA and the patterned samples were heated on a hotplate (50° C.) for 15 min.

Figure 3B:
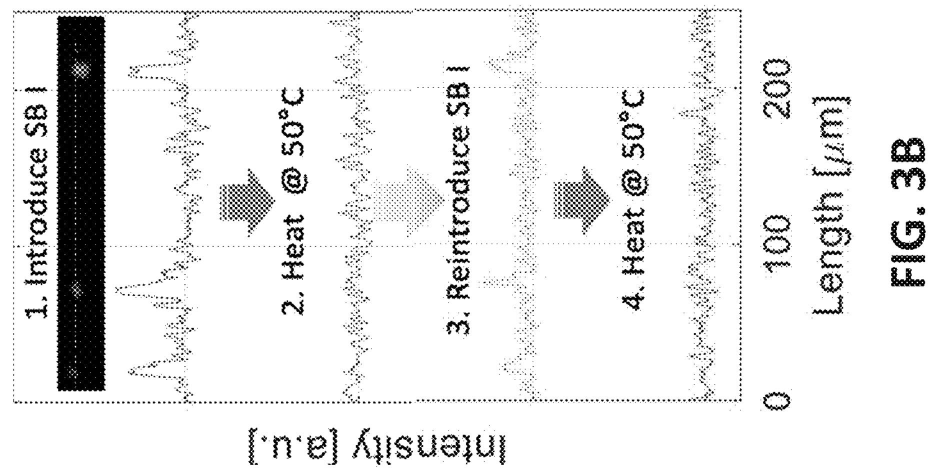
FIG. 3B provides line profiles of the fluorescence signals from the SSBD-deposited ssDNA-AuNP islands in two heating cycles, involving 4 steps: introduction of SG I, release of SG I by heating at 50° C., reintroduction of SG I, and re-heating.
Figure 3A:
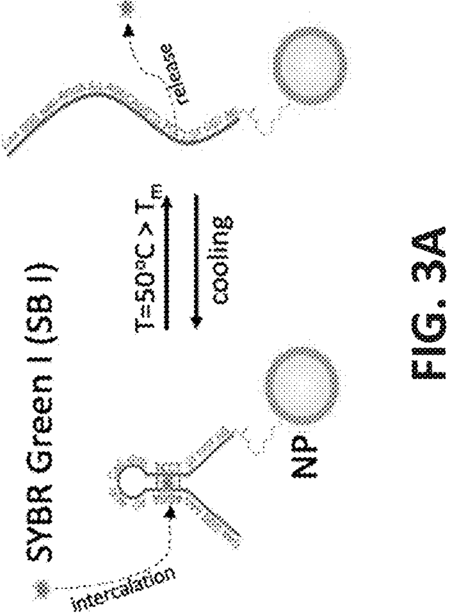
FIG. 3A provides a schematic of testing the viability of the ssDNA using the ssDNA's hairpin structure that can use SB I as a reporter. Upon heating, the hairpin structure will open up and the SB I released.
Figure 3C:
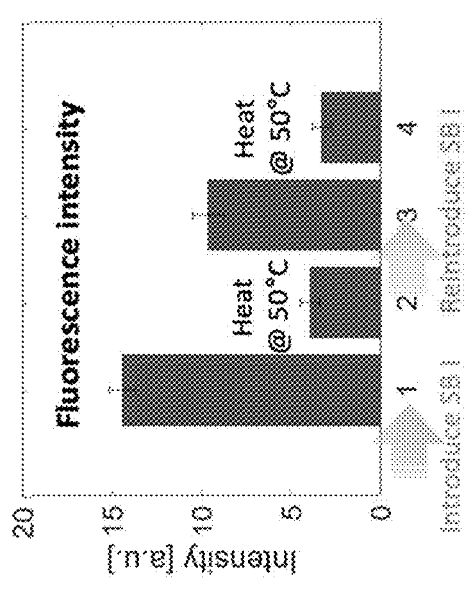
FIG. 3C provides average fluorescence intensities measured from 20 different SSBD-deposited spots, where the error bars represent the standard deviation.
Figure 3E:
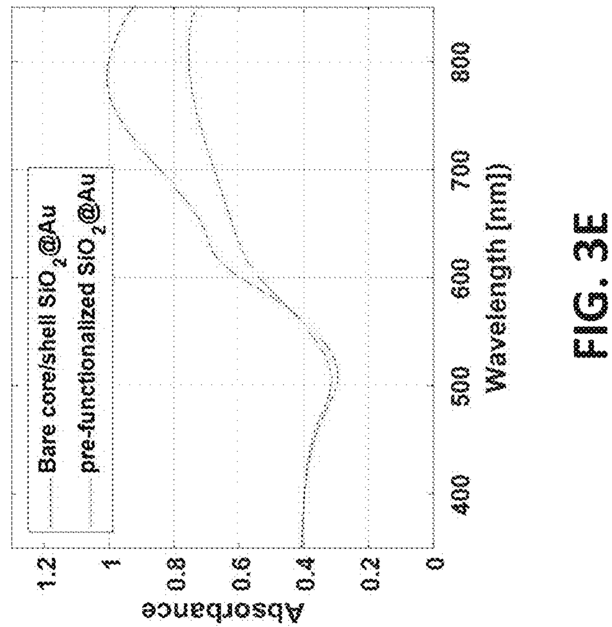
FIG. 3E provides the absorbance spectra of bare Au NPs and functionalized AuNPs measured in the suspension using UV-Vis equipment (V-670, Jasco). The peak absorption wavelength is about 785 nm, which can effectively absorb an 800 nm laser irradiation.
Figure 3D:
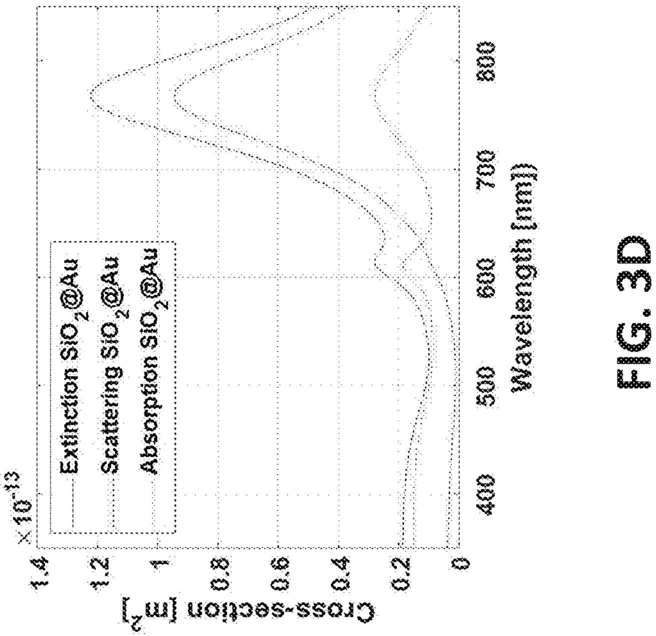
FIG. 3D provides calculated scattering cross-section for bare core-shell AuNPs.

As shown in FIG. 3B, green fluorescence signals were apparent from the SSBD-deposited particle spots after SG I was introduced to the solution. When the solution was heated to 50° C., the signals almost disappear, and when cooled down and SG I re-introduced, fluorescence is seen again despite reduced intensity. FIG. 3C quantitatively shows the average fluorescence intensity from an array of 20 SSBD-deposited spots, where the error bars are the standard deviation. These results indicate that the signals before and after heating are significantly different. There was an intensity decrease in the second thermal cycle (from ~14.5 to ~9.5) which indicated that the SSBD technique is even less damaging than heating at 50° C. for the biomolecules. These results confirmed that the SSBD process can maintain the viability of the functional molecules on particles, which makes the technique compatible to biological applications.

SSBD Versus Optical Pressure Deposition and TCPL Deposition

SSBD was compared to two deposition mechanisms mentioned previously (i.e., optical pressure (OP) deposition and contact line (i.e., TCPL) deposition).

Figure 4B:
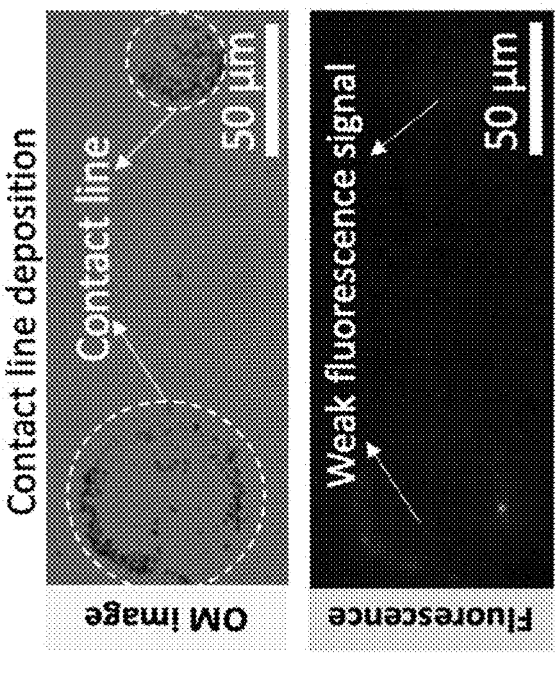
FIG. 4B—Top: Optical microscope image shows deposited AuNPs from the contact line deposition around a steady state photothermal bubble (see FIG. 1B for schematic). Ring-like patterns correspond to the contact line of the thermal bubbles. Bottom-Fluorescence signal is detected using is exposure time.
Figure 4A:
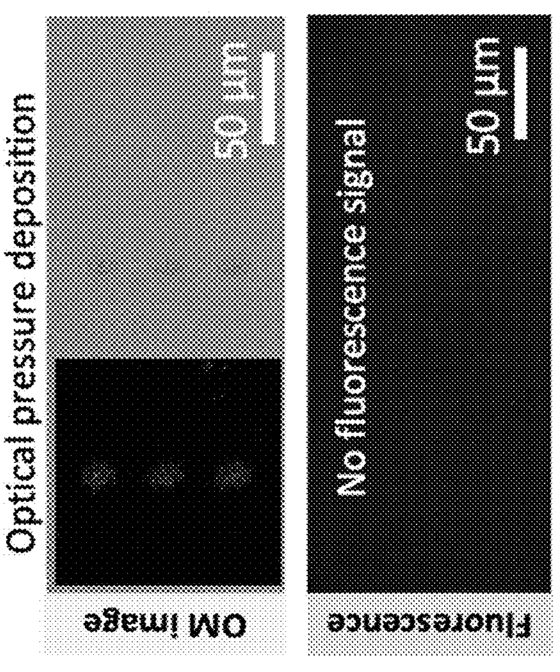
FIG. 4A—Top: Bright and dark field (inset) images of deposited patterns from the optical pressure deposition method (see FIG. 1A for schematic). Bottom—No fluorescence signal can be detected from the deposited spots.

In the optical pressure deposition (FIG. 1A), the optical force on the particles drives them to the surface and all deposited particles have been exposed directly to the laser irradiation. During OP deposition the laser power was reduced (~3.6 mW/$\mu$m$^2$ at the focal plane) so that no surface bubble was generated within the period of laser irradiation. To produce dense patterns on the glass substrate as shown in FIG. 4A (top), the optical shutter was opened and closed 30 times at the same location, after which a pattern of about ~15 μm in diameter, similar to the laser diameter (~12 μm), was produced. Survivability of the biological molecules on the AuNP surfaces after deposition was examined by intercalating dye, but a fluorescence signal could not be detected. FIG. 4A, bottom. This result agreed with expectations that the high absorption cross-section (as shown in FIG. 1E: ~$2.3\times10^{-14}$ m$^2$ for the core-shell AuNPs solution) of AuNPs may induce extreme heating of the NPs and even nanocavitation when directly irradiated by the laser at the SPR peak, and this would result in the destruction of ssDNA attached on the particle surface.

The contact line deposition mechanism leverages the fluid flow around the thermal bubble to capture and immobilize suspended particles at the TCPL (FIG. 1B). Although this technique is efficient in trapping particles, maintaining the bubble with continuous laser heating is not desirable as the bubble area is kept at a relatively high temperature which may lead to degradation of biomolecules. In addition, since the contact ring is usually a few times larger than the laser spot, the concentration of the deposited particles will be low compared to the SSBD-deposited spots. As shown in FIG. 4B, the deposited particle areas are 3-5 times larger than the laser spot size (~12 μm) depending on the sizes of bubbles when they detach from the surface. As expected, the patterns of the deposited particles are close to rings with higher density at the periphery. The fluorescence signal intensity from the deposited particles (FIG. 4B, bottom) was apparently lower than that from the SSBD-deposited spots (FIG. 3B), which can be partially attributed to the fact that the contact line deposited NPs spread over a larger area and thus lower density, besides thermal degradation of the bio-molecules.

Controlling the SSBD Process

The SSBD process can be intensified by the influence of various experimental factors. For example, a lower-temperature bulk fluid may act to enhance the Marangoni flow by causing a larger temperature difference at the bubble boundary, and a change in air solubility may affect the bubble size. Alternatively, allowing for a sufficient time until one bubble process is completed to avoid heating of the bulk fluid.

When implementing the SSBD for mass production of sensors, the lifetime of bubble is a factor to consider for the fabrication time scale. Production can involve sequential deposition or parallel deposition. The lifetime of bubbles with different peak sizes, are achieved by varying the illumination time (1-5 s) of the incident laser. To test mass production, a 5×4 microarray of patterns was fabricated on the glass substrate with the pitch of ~100 μm. FIG. 5A. The SSBD deposited particles are dense and closely packed (e.g., FIG. 5B).

Assuming ideal gas and diffusion-governed process, the lifetime of a microbubble ($T_B$) can be estimated as:

$$\tau_B = \frac{P_0 K}{6RTD\gamma} a^3 \tag{3}$$

where $P_0$ is ambient pressure, $\gamma$ ($72\times10^{-3}$ N~$m^{-1}$) is surface tension, K is Henry's coefficient, R is ideal gas constant (8.31 J·$mol^{-1}$·$K^{-1}$), T is temperature of the microbubble and D is diffusion coefficient. Based on measurements (FIG. 5C), the lifetime of microbubble estimated from videography scales linearly with the volume (i.e., $\alpha^3$) of the bubble as shown in FIG. 5D, which is consistent with the above equation. The SSBD process can have a time scale of seconds to several minutes, depending on the size of the bubble. In mass production, one may generate a large array of bubbles and let them shrink simultaneously to increase productivity.

The size of bubble can directly influence the size of the eventually deposited particles spot size. In a similar vein, controlling the concentration of the particles in the solution provides another route to tune the amount of particles the bubble can capture. To analyze the above two controlling strategies, three different concentrations of functionalized AuNP suspensions, including optical densities (OD) of 0.75, 0.32 and 0.15 at 800 nm. At each concentration, 20 bubbles with different peak sizes were produced. The sizes of the bubbles were determined through videography analysis, and the images of the deposited AuNP patterns were observed using an optical microscope. To define the size of the pattern, roundness (FIG. 5E) is first introduced as:

$$\text{Roundness } (\%) = \frac{4 \times A_{Au}}{\pi L_m^2} \tag{4}$$

where $A_{Au}$ is the area of the AuNP pattern, and $L_m$ is the length of the major axis, which is used to denote the pattern size. FIG. 5E shows that the patterns all have roundness greater than 50% with a mean value of ~80% and a spread of ~20% (see FIG. 5H for the histogram of roundness). It was also observed that when the particle concentration increases, the average size of the spots increases but the average roundness does not change significantly. FIG. 5F shows the pattern area as a function of the calculated surface area of bubble. For each concentration, pattern area and bubble surface area generally follow a linear relation, with the slope of the linear fit increases with the concentration of the particles. The fitting parameters are shown in Table 1 for the three linear curves.

TABLE 1

Fitting parameters for the surface area of bubble and pattern area shown in FIG. 5F.

| | Linear fitting | | |
|---|---|---|---|
| OD at 800 nm | Slope | Intercept | $R^2$ |
| 0.75 | 0.0224 | −12.2 | 0.789 |
| 0.32 | 0.0100 | −0.3 | 0.926 |
| 0.15 | 0.0045 | 7.1 | 0.786 |

Larger bubble surfaces can capture more particles from the suspension, which are eventually brought to the TPCL before it contracts to a concentrated spot upon bubble vanishing. As a result, the SSBD-deposited spot area can scale linearly with the surface area of bubble as observed in FIG. 5F. A simple model relating the SSBD spot size, OD and bubble surface area can also be obtained by fitting to all data in FIG. 5F, and the model is shown as Equation S1:

$$z(x,=0.03xy+2.1, \text{ if } xy>0 \tag{S1}$$

where, z and x are pattern area and surface area of bubble, respectively, and y is OD. The parity plot for pattern area predicted using Eq. S1 is provided in FIG. 5G.

Direct Observation of Nanoplastics in Ocean Water Using SSBD

Plastics production surpasses all other synthetic materials globally, with 5-13 million tons entering the oceans every year, posing serious environmental challenges. Plastics in the environment can be fragmented by UV irradiation and mechanical means into micro- or even nano-particles. While microplastics have been detected in ocean water, nanoplastics have not been unequivocally detected in the ocean. However, detection of such nanoplastics may be possible using SSBD.

Nanoplastics research is an emerging field. Toxicological investigations into nanoplastics should address the route of exposure (e.g., inhalation, ingestion, or dermal penetration), concentrations, and particle morphology. Little evidence regarding exposure levels is currently available, and hurdles with separation, identification, and quantification of environmental nanoparticles have made appropriate studies difficult to design.

Although there is no consensus on the size of "microplastics" and "nanoplastics" some have defined microplastics as ranging from 1-5,000 μm and nanoplastics with a size less than 1 μm.

The toxicity of micro- and nanoplastics to living organisms is found to be inversely related to particle size. For example, when laboratory-synthesized PS particles are ingested, nanoparticles (NPs) have a more negative impact on growth and reproduction than microparticles. Additionally, in a laboratory setting, while microplastics were not found in fish brains after exposure, nanoscale particles were observed to cross the blood-brain-barrier and accumulate in fish brains, causing behavioral disorders and oxidative DNA damage.

Indeed, of the 5 to 13 million tons of plastics entering the oceans annually, less than 300 thousand are estimated to be floating on the surface. This discrepancy may be partially attributed to undetected colloidal nanoplastics or the deposition of aggregates to the seabed following a loss of colloidal stability. To date, no method appears sensitive enough to detect low concentrations of nanoplastics in the environment.

At most, Ter Halle, A. et al. Nanoplastic in the North Atlantic subtropical gyre. *Environ. Sci. Technol.* 51, 13689-13697 (2017) reported finding nanoplastics in the North Atlantic Ocean subtropical gyre using pyrolysis-coupled gas chromatography-mass spectrometry (Pyr-GC/MS). From the spectra, Ter Halle observed signatures of polyethylene (PE), PS, polyvinyl chloride (PVC), and polyethylene terephthalate (PET). Ter Halle used a nano-membrane ultrafiltration technique prior to Pyr-GC/MS characterization. However, the filtration technique may have artificially reduced the detected abundance by removing high aspect ratio nanoplastics (e.g., nanofibers) and losing particles via attachment to the filter. More importantly, in the absence of direct visualization, the plastic signature in the Pyr-GC/MS spectrum can not be definitively attributed to nanoplastics. It could, instead, be attributable to oligomers: styrene oligomers, short fragments of PS, have been detected in seawater from the West Coast of the U.S.

Figure 6A:
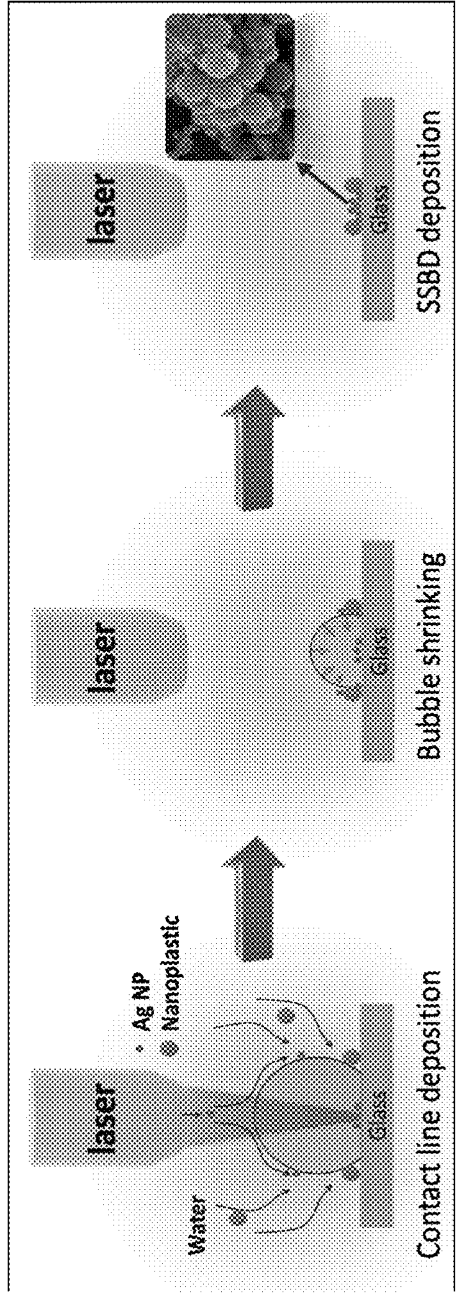
FIG. 6A shows a schematic of the SSBD process, where a thermal bubble is generated by laser heating creating a flow to collect colloidal particles and deposit them to a high-density spot after the bubble shrinks and vanishes.

Rather, direct visualization of nanoplastic particles is needed to confirm their existence in the ocean and their morphological characters. The morphological characters often greatly influence the toxicity of the nanomaterials. For example, it is found that high aspect ratio nanotubes, despite their micrometer length, can have significant toxicity implications on mice. Using scanning electron microscopy (SEM) the experiments shows the morphology of the nanoplastic particles, use energy-dispersive X-ray (EDX) spectroscopy to confirm their carbon nature, and use surface-enhanced Raman spectroscopy (SERS) to identify their polymer chemistry. These characterizations are made possible by the unique SSBD technique, which captures colloidal nanoplastics in the water samples and concentrates them on a substrate surface. FIG. 6A.

Samples of ocean water were collected from locations on the coastlines of China, South Korea, and the United States, including deep (>300 m) in the Gulf of Mexico, as indicated in Table 2.

Nanoplastics were identified with a variety of compositions, including polycaprolactam (Nylon), polystyrene (PS), and polyethylene terephthalate (PET)—all commonly used daily consumables (e.g., textiles, coffee cup lids and water bottles). The plastic particles found possessed diverse morphologies, such as nanofibers, nanoflakes, and ball-stick nanostructures.

Figure 6B:
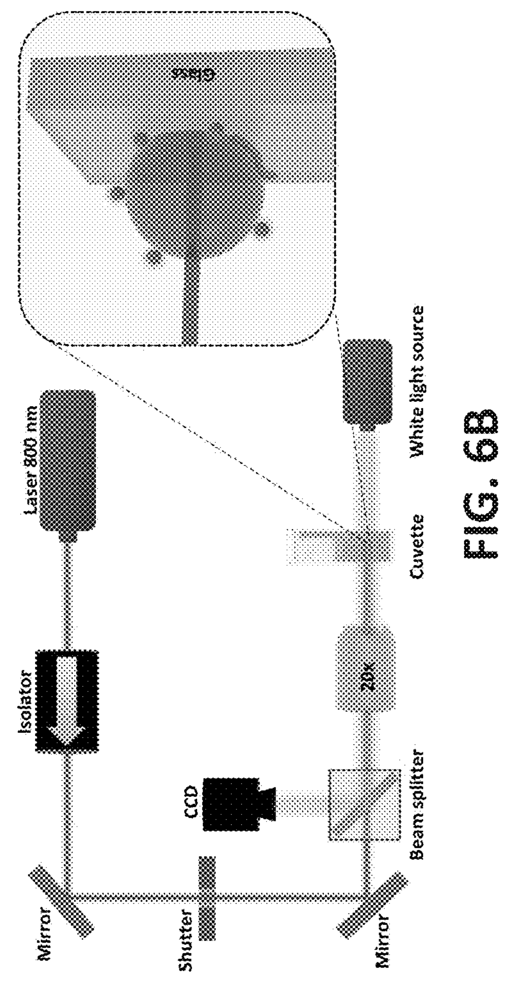
FIG. 6B is an optical setup for the SSBD process.
Figures 7A, 7B, 7C, 7D:
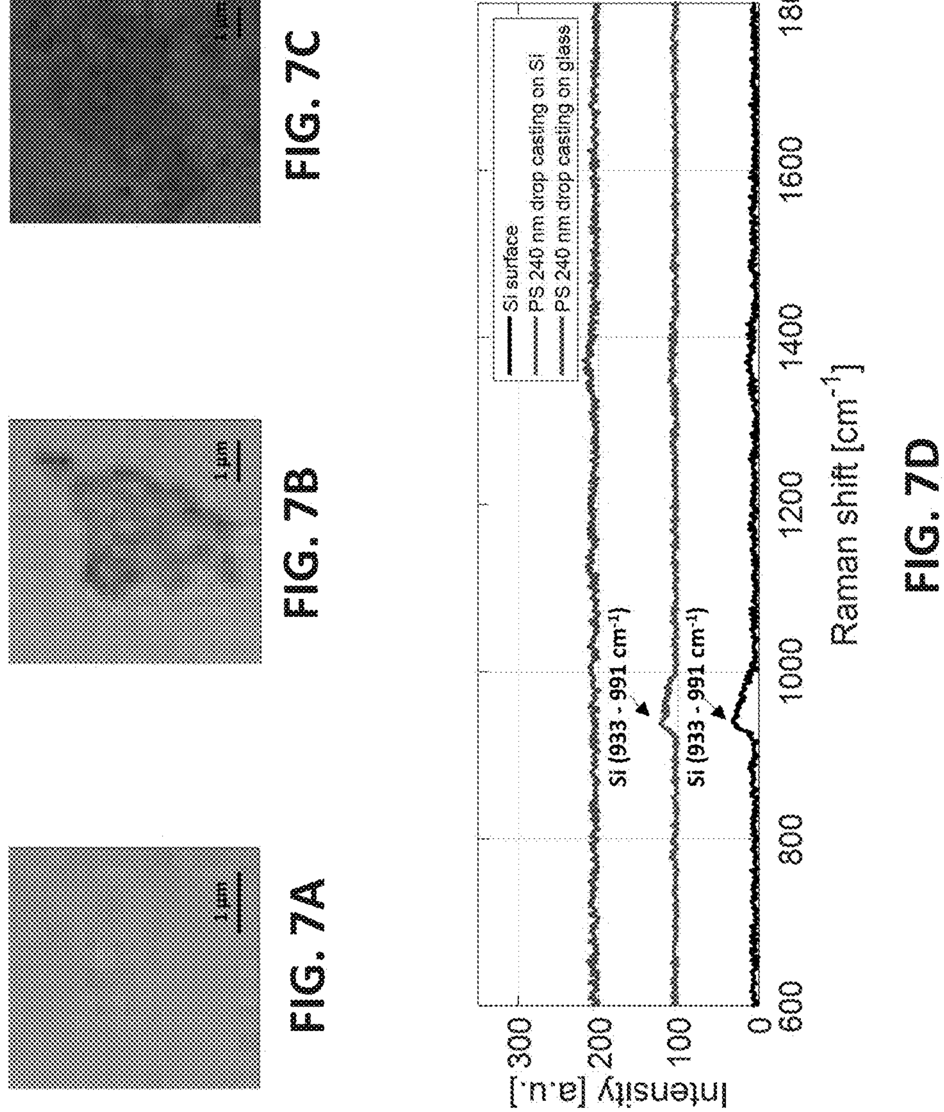
FIG. 7A is an optical microscope image of a Si substrate.
FIG. 7B is a drop casting of a engineered PS (240 nm) solution with a relatively high concentration of 5 ppm on the Si substrate.
FIG. 7C is a drop casting of the PS (240 nm) solution (5 ppm) on a glass substrate.
FIG. 7D is a Raman spectra of bare Si surface, PS on Si and PS on glass. No PS Raman peaks could be observed from these spectra due to the lack of the SERS effect. Only silicon peaks could be observed. With SERS enabled by SSBD, PS could be detected with a concentration of 0.1 ppm (see FIG. 16).

In the SSBD process, the as-collected seawater samples were mixed with silver (Ag) NP suspensions with a 1:4 volume ratio. A laser was then directed into the aqueous sample, and due to the laser heating of the Ag particles, a thermal bubble is generated on the surface of a glass substrate. FIG. 6A and FIG. 6B. The thermofluidic flow around the bubble draws colloidal particles to the bubble surface and deposits the colloidal particles to the three-phase contact line (FIG. 6A). When the surface bubble grows to ~50 μm in diameter, laser heating is stopped to allow the bubble to shrink until it vanishes. As the bubble shrinks, the contact line contracts, piling the collected particles into a high-density spot, which greatly increases the possibility of finding the colloidal particles in SEM (inset image in FIG. 6B). During this process, the plasmonic Ag NPs in the suspension are co-deposited with nanoplastics, enabling the SERS effect that enhances the Raman signal by orders of magnitude to allow the identification of the chemistry of trace amount of nanoplastics (Method). Without the co-deposited Ag NPs, no clear Raman signals of nanoplastics could be detected. See FIG. 7A-D.

In particular, the seawater samples for SSBD were prepared by mixing 800 μL of Ag NP suspension (10 nm, 0.02 mg/ml supplied in 2 mM sodium citrate, Abs. 390-400 nm, Thermo Scientific Chemicals) and 200 μL of as-collected seawater. The solution was contained in a quartz cuvette with a glass slide inserted therein (FIG. 6B). An 800-nm femtosecond pulsed laser (Spectra Physics, Tsunami) with a repetition rate of 80.7 MHz and a pulse duration of 200 fs was directed to the sample using a 20× objective lens with a numerical aperture of 0.42. The laser was illuminated for ~10 seconds to generate photothermal surface bubbles on the glass substrate. The plasmonic effect produced by Ag NPs with a size of 10 nm, which has a surface plasmon

TABLE 2

Water collection sites

| Geographical location | | | Latitude/ Longitude | Water depth collection | Particle detected: SERS detected? | Particle detected: SEM detected? |
|---|---|---|---|---|---|---|
| USA | California | Long Beach: Pier Point Harbor | 33°45'40.0"N/ 118°11'45.6"W | Surface | Nylon | Yes |
| | | Marina Del Rey: Main channel | 33°57'43.9"N/ 118°27'25.2"W | Surface | PS | No |
| | Massachusetts | Dartmouth: Apponagansett Bay | 41°35'10.5"N/ 70°57'14.5"W | Surface | PS | No |
| | Texas | Cole Park | 27°46'24.2"N/ 97°23'19.0"W | Surface | PS | Yes |
| | Gulf of Mexico | FGRR45 (XR2 2204) | 27°45'57.6"N/ 93°37'48.0"W | Surface | PS | No |
| | | | | 311 m | PET | Yes |
| South Korea | Ulsan | Daewangam Park | 35°29'21"N/ 129°26'23.5"E | Surface | PS | No |
| | Jeju Island | Yongduam Rock | 33°30'58.9"N/ 126°30'43.6"E | Surface | PET | Yes |
| China | Shenzhen | Longgang | 22°36'12.3"N/ 114°21'26.3"E | Surface | PS Unidentified | No Nanofiber |

Figures 8A, 8B:
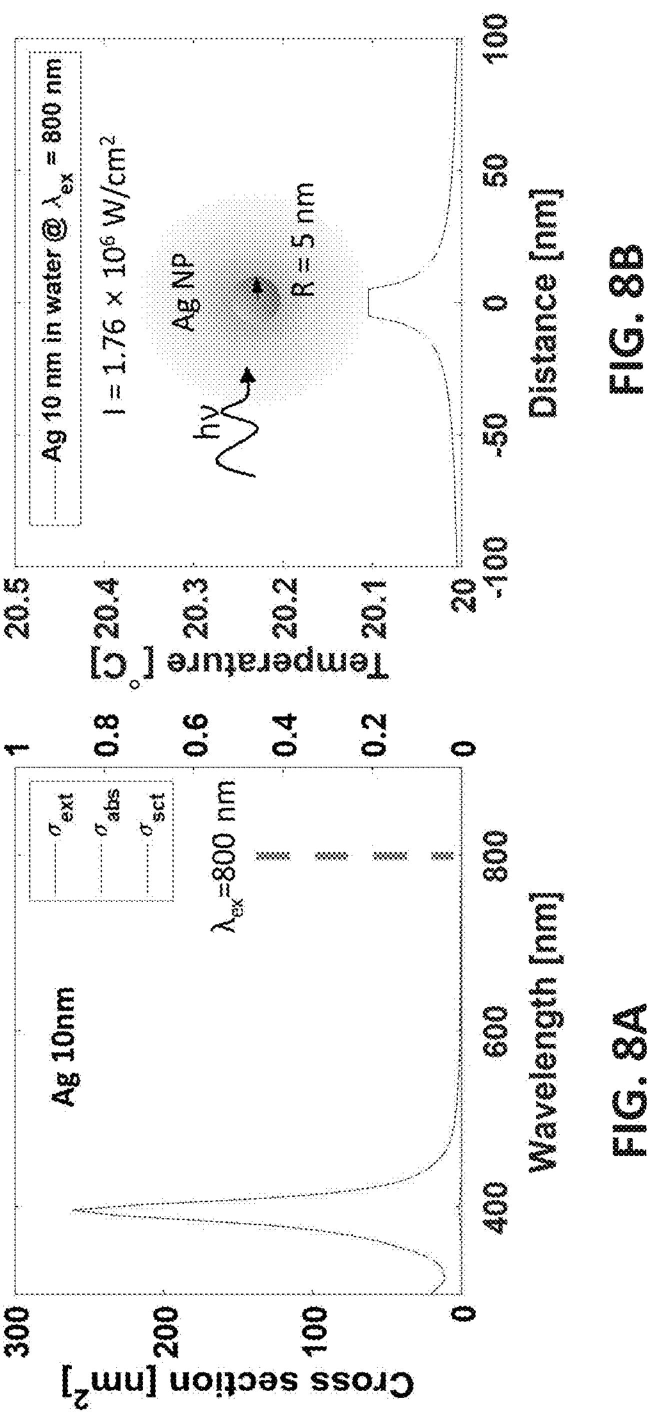
FIG. 8A is the calculated optical cross-sections of an Ag NP.
FIG. 8B is a temperature profile of a single Ag NP in water environment.

*Surface denotes less than 1.5 m.

resonance of ~400 nm, is too weak to create a photothermal bubble unless long laser irradiation is used. FIG. 8A-B.

The optical cross-sections ($\sigma$) of the Ag NP as shown in FIG. 8A were calculated by COMSOL Multiphysics. A spherical NP with a radius (R) is surrounded by water domain including the Perfect Matching Layer (PML). The PML layer absorbs all outgoing wave energy without impedance mismatch that can cause stray reflections at the boundary. To estimate the temperature profile of the Ag NP in the water (FIG. 8B) at the given experimental excitation wavelength, the analytical solution for the 1-D heat conduction equation is used:

$$T(r) = T(\infty) + \frac{P_0}{4\pi\kappa_{water} r} \text{ for } r > R, \qquad \text{(S5)}$$

where $T(\infty)$ [K] is ambient temperature, $P_0$ is the heat power dissipated in the NP, $\kappa_{water}$ is the thermal conductivity of water, R is the radius of the NP, and r is the radial coordinate. The heating power dissipated in the NP is given by $P_0=\sigma_{abs}I$, where $\sigma_{abs}$ is the absorption cross-section of NP at the excitation wavelength obtained from FIG. 8A and I ($=1.76\times10^6$ W/cm$^2$) is the power density of the excitation laser.

Figures 9A, 9B:
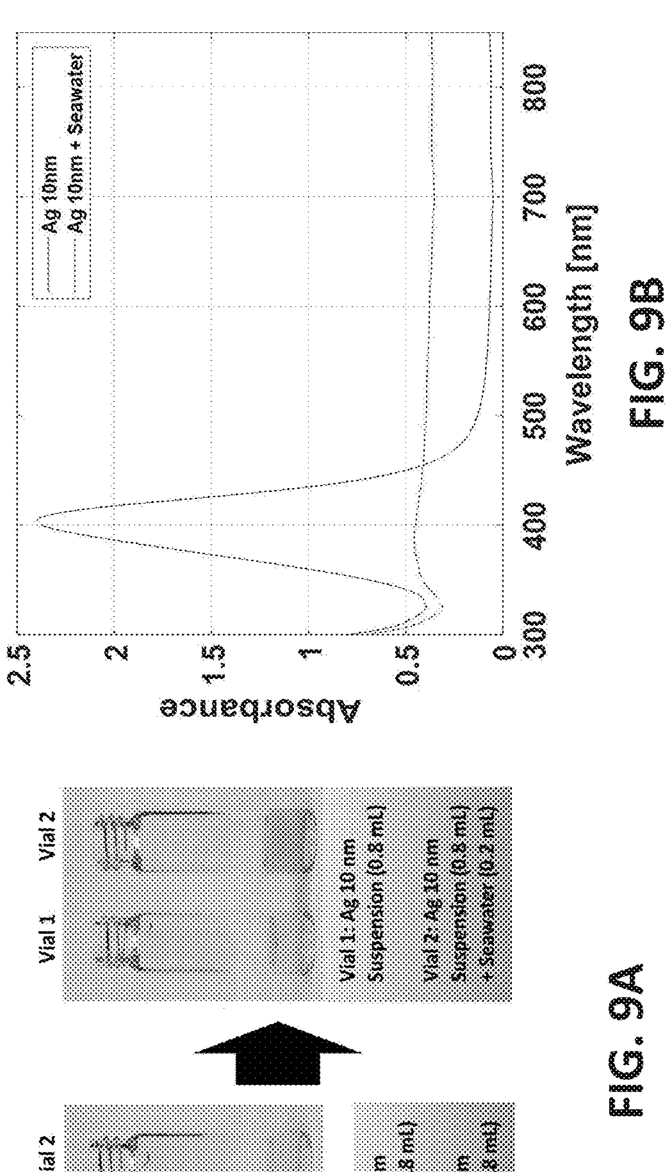
FIG. 9A is a Ag NP (10 nm) suspension before and after mixing with seawater. Mixing with seawater changes the suspension to a darker color.
FIG. 9B is the measured absorbance of the pure Ag NP suspension and the Ag NP suspension mixed with seawater.
Figures 10A, 10B, 10C:
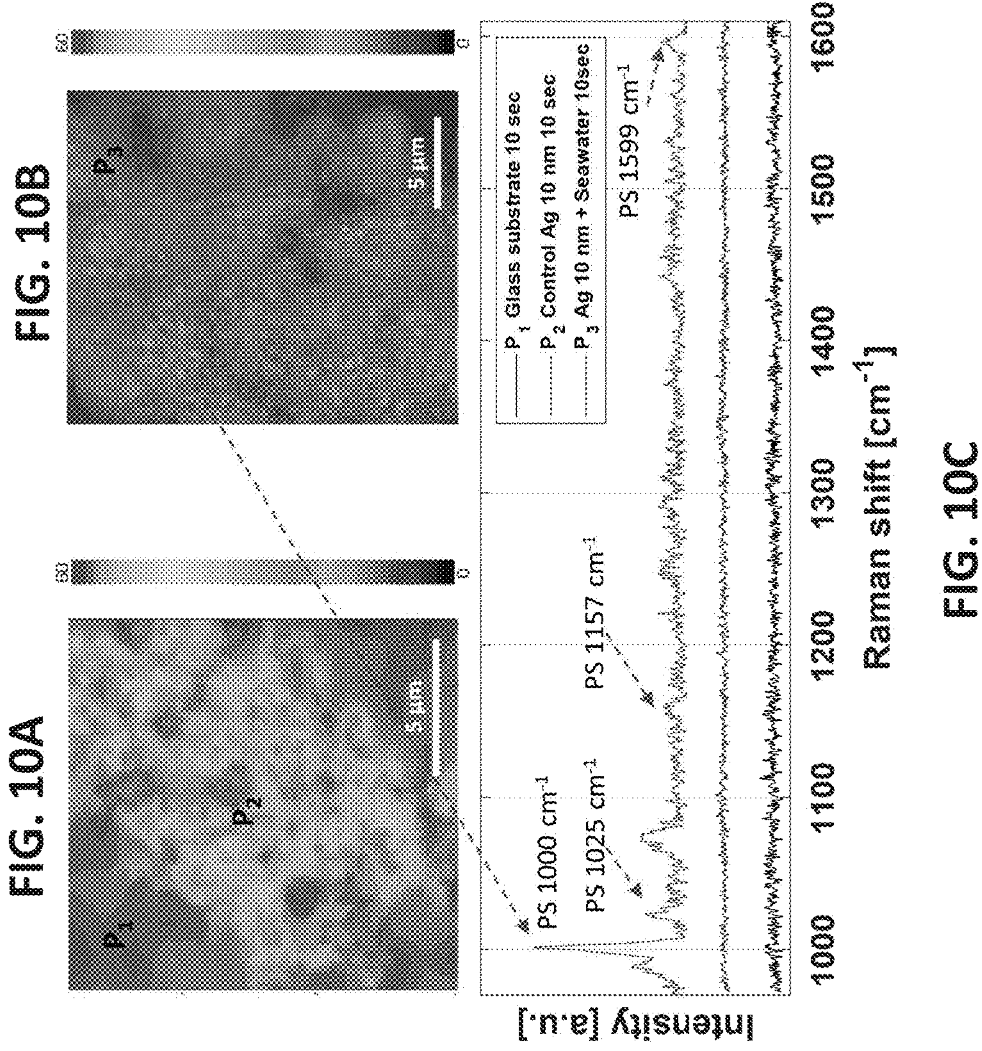
FIG. 10A is an overlay of the control sample and Raman mapping at 1000 $cm^{-1}$ with 1200-groove/mm grating.
FIG. 10B is an SSBD spot deposited using the mixture suspension of Ag NP and seawater. It shows the overlay image of the SSBD spot and Raman mapping at 1000 $cm^{-1}$.
FIG. 10C is a typical SERS spectra detected from the seawater and control samples.

When mixed with seawater (pH=8.1), Ag NPs agglomerate and the overall light absorbance increases (FIGS. 9A-B), allowing bubble formation. (As seawater water is added into the Ag NP suspension, the resonance peak at about 400 nm disappeared due to the aggregation of Ag NPs and the overall absorbance increased, resulting in sufficient laser-to-heat conversion and thus surface bubble generation.) After the bubble shrank and eventually vanished, the glass substrate was taken out of the solution and dried for 2 hours. Raman mapping was conducted using the deposited sample. Due to the co-deposition of colloidal nanoplastics and Ag NPs, the SERS effect is activated. It was also confirmed that the as-purchased Ag NPs do not contain any plastics. See FIGS. 10A-C: The control sample was fabricated by the SSBD process using pure Ag NP 10 nm suspension without seawater. NaCl was added into the sample to aggregate Ag NPs for bubble generation. From the control Ag NP sample and glass substrate, only weak fluorescence signals were observed between 1300 and 1400 cm$^{-1}$, while that from seawater shows obvious PS peaks. For the spot with PS peaks, no plastic particles were observed in SEM.

For the SEM imaging, a 3.0-nm Au/Pd layer was coated on the SSBD spots using a sputtering device (ACE600 Carbon & Sputter Coater). Field emission SEM (Magellan 400) was used to acquire the images at a 5 keV accelerating voltage. EDX mappings were conducted at 10 keV (acquisition time: 60 s) using a Bruker EDX system (Bruker Nano GmbH Berlin) on a FIB-SEM (Helios G4 UX, ThermoFisher Scientific) platform.

Chemical identification of nanoplastics can be characterized by Raman vibrational bands. The spatial resolution ($\rho$) in this setup (NRS-5100, Jasco, confocal Raman microscope) is diffraction-limited to 532 nm ($\rho=0.61\lambda/NA$, where $\lambda$ (=785 nm) is the wavelength of light and NA (=0.9) is the numerical aperture of the objective lens). SERS utilizes an optical electric field in the nanoscale spatial region which is produced by localized surface plasmon resonance of the metal NPs so that it has the advantage of enhancing the Raman signals of the label-free analytes. Thus, the fingerprint of the nanoplastics was investigated using an Ag-based SERS spot that SSBD produced. SERS mapping was acquired at 1.5 μm intervals using the 785 nm excitation laser with 600-groove/mm grating unless otherwise noted. The Raman system included microfocus with a 100× objective lens. The excitation power was about 35 mW. The center wavenumber was fixed at 1300 cm$^{-1}$. The scattered light was detected with a backscattering configuration. Automatic fluorescence correction was applied to all Raman mapping measurements.

1. Observation of Nylon Nanofibers

Figures 11A, 11B, 11C, 11D, 11E:
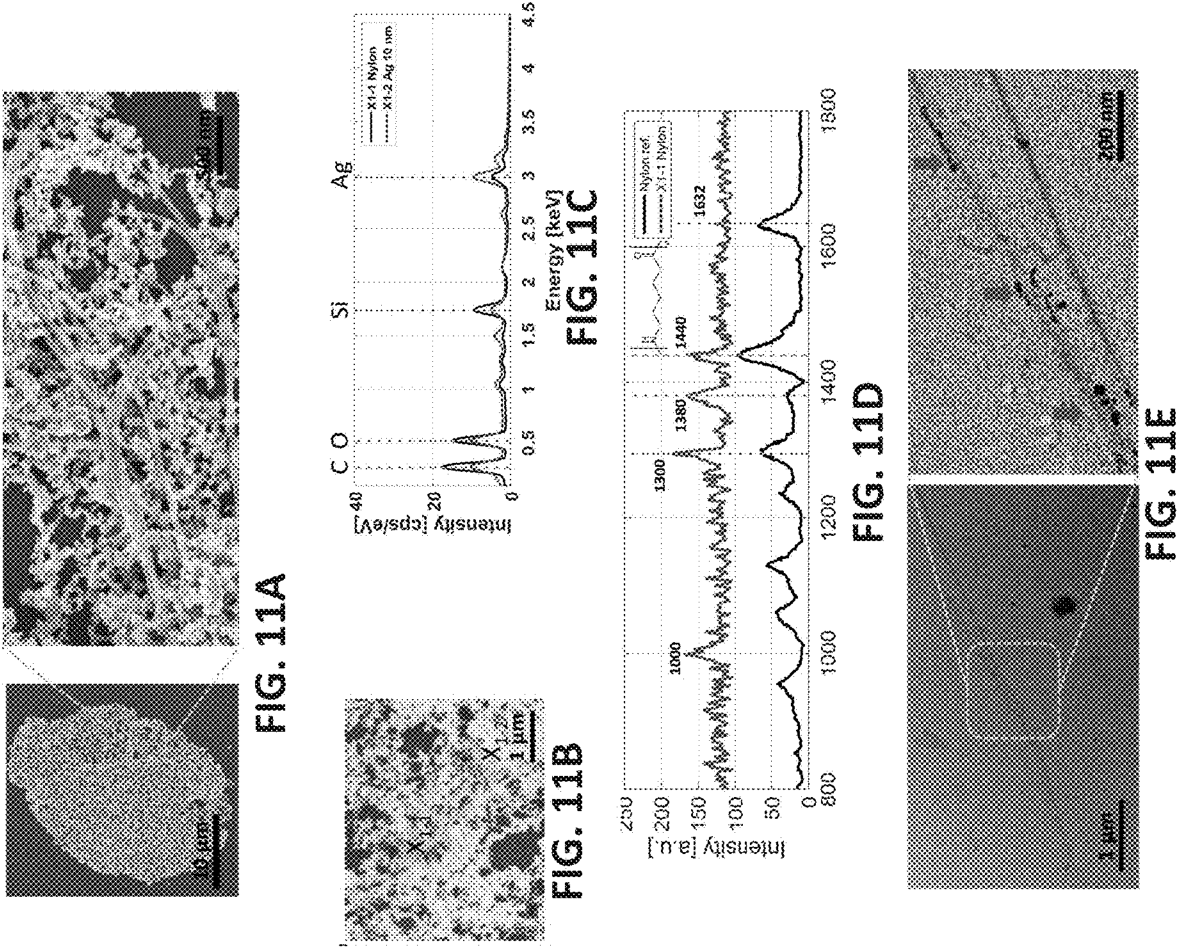
FIG. 11A are SEM images of the whole SSBD spot (left) and nanofibers co-deposited with Ag NPs (right).
FIG. 11B is an EDX elemental mapping overlaid with the SEM image.
FIG. 11C is contrasting spectra showing the nanofibers are of a carbon nature.
FIG. 11D is the obtained SERS spectrum (top) shows several peaks corresponding to Nylon reference peaks (bottom).
FIG. 11E are the TEM images of nanofibers showing hetero-aggregation and adsorption of nanoplastics, as indicated by the arrows. The TEM sample was prepared using SSBD in pristine seawater without Ag NPs, where the carbon TEM grid absorbed laser energy and generated a bubble.

In the seawater from Long Beach, CA, nanofibers were found in the SSBD spot (FIG. 11A) whose diameters were ~20 nm and lengths were longer than several micrometers. The corresponding EDX elemental mapping in FIG. 11B shows uniform carbon elements along the nanofibers. Two selected points of EDX spectra are compared, with one from the nanofiber-rich ($X_{1-1}$) region and the other from the Ag-rich ($X_{1-2}$) region (FIG. 11C). The differences in the two spectra confirm that the nanofibers contain carbon (x-ray energy of 0.277 keV) and show they also contain oxygen (0.525 keV): noting the silicon peak is from the glass substrate.

The obtained SERS spectrum (FIG. 11D) showed peaks of weak amide I (C═O stretch) at 1632 cm$^{-1}$, strong $CH_2$ bending at 1440 cm$^{-1}$, wagging at 1380 cm$^{-1}$, and twisting at 1300 cm$^{-1}$. Many of these peaks correspond well to the signature of Nylon (polycaprolactam) reference. Not every Nylon peak shows up in the SERS spectrum, which may be attributed in that the peaks can be weakened or absent when the Raman polarizability component is tangential to metal surfaces, which are from the Ag NPs in this experiment. The unidentified peak at 1000 cm$^{-1}$ may be attributed to the reported hetero-aggregation or adsorption of nanoplastics, which is confirmed by transmission electron microscope (TEM) characterization (FIG. 11E). Considering the shape of the nanostructure from SEM, its constituent atoms from EDX, and chemical signatures from SERS, it is believed the observed nanofiber is Nylon. This demonstrates that nanoplastics can take the form of nanofiber in marine environments after the degradation of Nylon, which can be from industrial wastewater, abandoned dumps, fishing gears, or laundry wastewaters. If nano-filtration was used, as adopted by the other nanoplastic detection studies (Pyr-GC/MS), the long nanofibers could not have been found, leading to a misunderstanding of the nanoplastics in the environment. In the water sample from Shenzhen, China, we have also observed similar nanofibers. We have confirmed that they are of carbon nature, but their chemistry is not conclusively.

2. Observation of PS Nanoplastics

Figure 16:
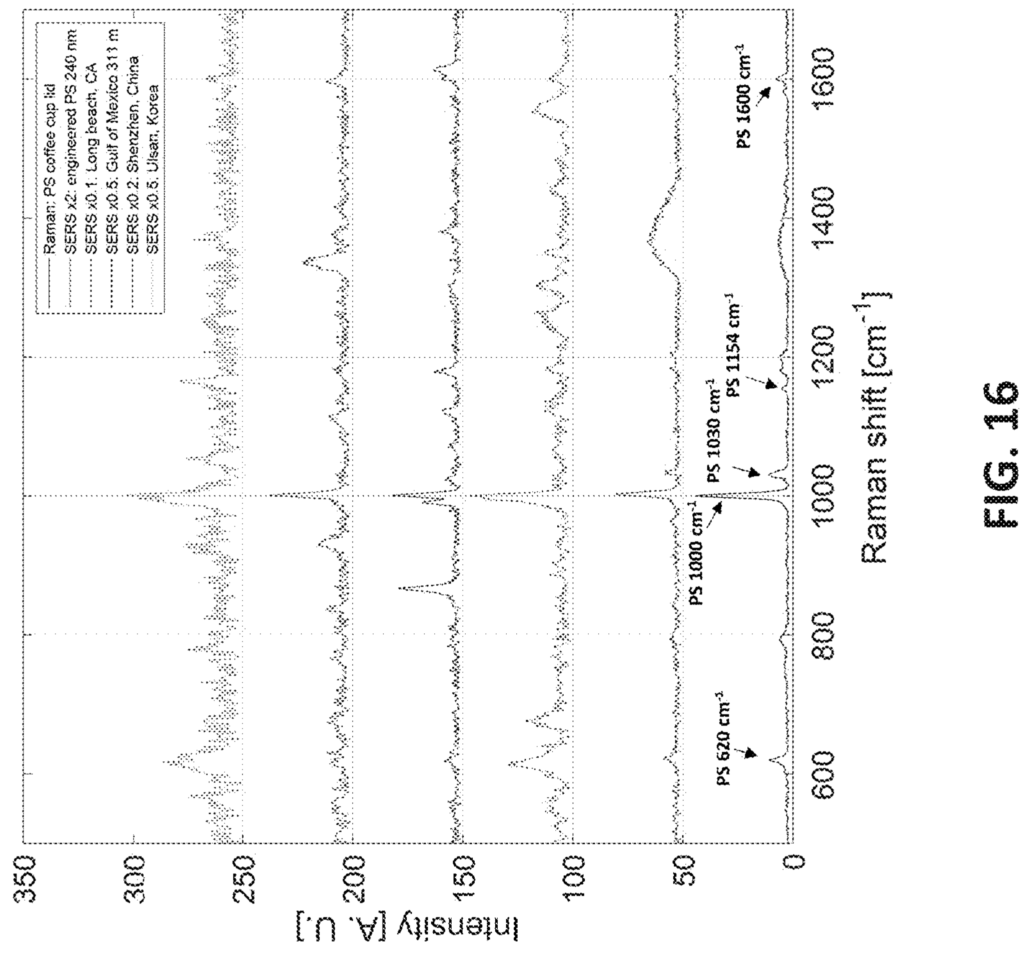
FIG. 16 is Raman spectra of a reference PS sample and water samples from different locations. Bottom/first line: PS Raman spectrum obtained from a coffee-cup lid. Raman exposure time was 10 s, and data acquisition was performed 10 times at one location to increase the signal-to-noise ratio. Second line: SERS spectrum of engineered PS NPs (240 nm, 0.1 ppm) co-deposited with Ag NPs (10 nm) by SSBD. Third (Long Beach, CA), fourth (Gulf of Mexico), fifth (Shenzhen, China), and sixth (Ulsan, Korea) lines are SERS spectra of seawater obtained from different sites, but no PS particles could be observed from SEM in these samples.

In the seawater collected from Corpus Christi, TX, several irregularly shaped particles were found. The EDX elemental mapping of the SSBD spot showed several carbon-rich regions (FIG. 12A), and FIG. 12B shows the contrast between the carbon-rich and Ag-rich regions. SEM reveals that these are particles with certain dimensions less than 1 μm (FIGS. 12B and 12C). The irregular structure in FIG. 12C with sub-micron thickness appears to be a partially damaged flake which may result from wear or other types of degradation. The image of another structure (FIG. 12D) appears to be a particle undergoing division into two smaller ones. The measured SERS spectrum has several peaks that match the reference peaks from PS (FIG. 12E and FIG. 16). According to the report on nanoplastics in the North Atlantic subtropical gyre using Pyr-GC/MS, polystyrene is one of the most abundant polymeric species as suggested by Pyr-GC/MS, but these images are the first time their morphologies are revealed. It is noteworthy that the appearance of colloidal PS nanoplastics in the ocean differs significantly from those synthesized in the laboratory (FIG. 13), which are routinely used for toxicity studies.

Interestingly, in many water samples, the PS signals were detected by Raman analysis but no PS particles could be seen by SEM (Table 2 and FIGS. 16 and 10A-C). Oligomers, specifically smaller styrene oligomers, however, are too small to be captured by SEM imaging techniques.

3. Observations of PET Nanostructures

Figure 13:
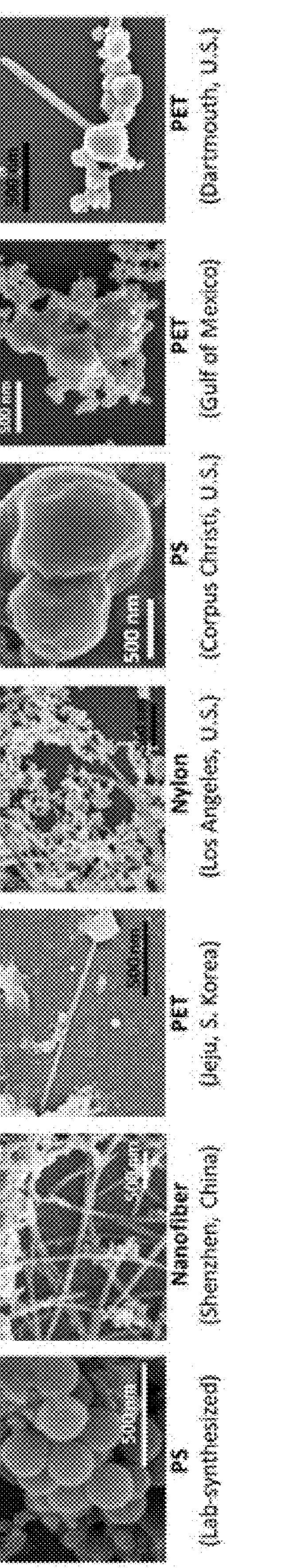
FIG. 13 are SEM images of nanoplastics observed from different water samples, which show the diverse morphologies of nanoplastics in environmental water and how they are distinct from laboratory-synthesized plastic NPs.
Figure 14A:
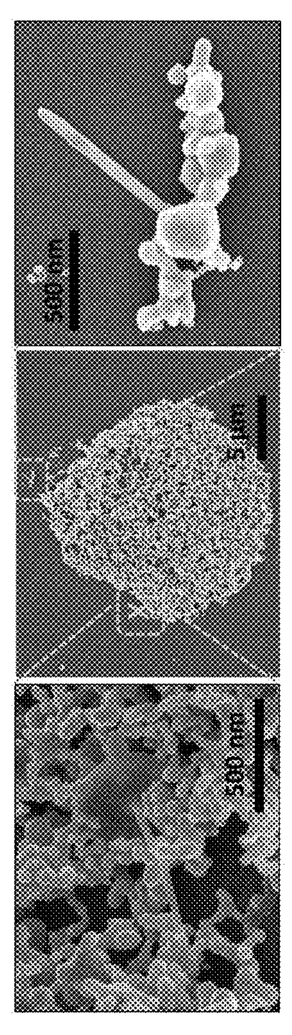
FIG. 14A are SEM images of SSBD deposition (center) and ball-stick nanostructures for the Long Beach sample. $X_1$ indicates the location characterized by SERS.
Figure 14B:
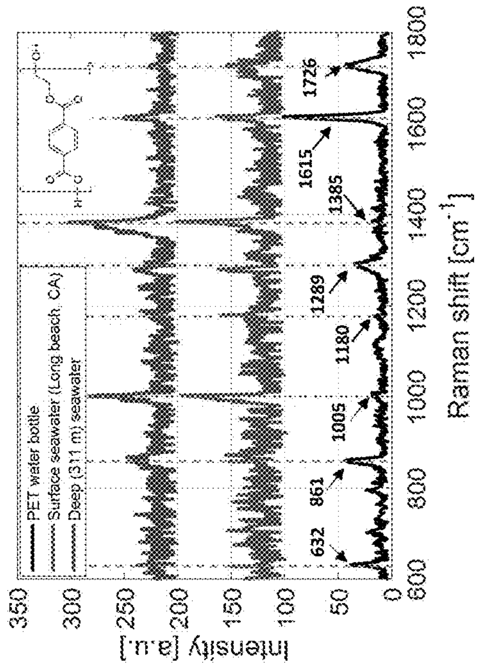
FIG. 14B are SERS spectra of the surface seawater sample from Long Beach (middle) and 311 m-deep seawater from the Gulf of Mexico (top). In comparison is the PET reference Raman spectrum obtained from a commercial water bottle (bottom).

In seawater samples from Long Beach, CA, nanostructures with a ball-stick shape were found (FIG. 14*a*). According to the SERS spectrum, most peaks agree well with those from a benchmark Raman spectrum from PET plastic water bottles (FIG. 14B). Some of these prominent peaks are attributed to the ester C(O)O bending mode at 861 $cm^{-1}$, symmetric C—O—C stretching at 1180 $cm^{-1}$, $CH_2$ wagging at 1289 $cm^{-1}$, aromatic ring stretching at 1615 $cm^{-1}$ and C═O stretching at 1726 $cm^{-1}$. It is known that PET can have the ball-stick morphology from electrospinning processes. Some bacteria also have ball-stick shapes, but they would flatten after full dehydration. To further confirm that the identified nanoparticles were not bacteria, samples were dehydrated for two weeks and observed under SEM again. The particles remained the original 3D structures (FIGS. 15A-G), in contrast to bacteria. The ball-stick-shaped PET nanoplastics are also found in water from Jeju, South Korea (FIG. 13).

Figure 14C:
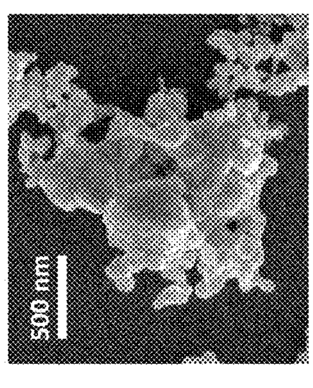
FIG. 14C is a SEM image of the PET discovered in the deep seawater, which is also the location for SERS measurement.
Figures 15A, 15B, 15C, 15D, 15E, 15F, 15G:
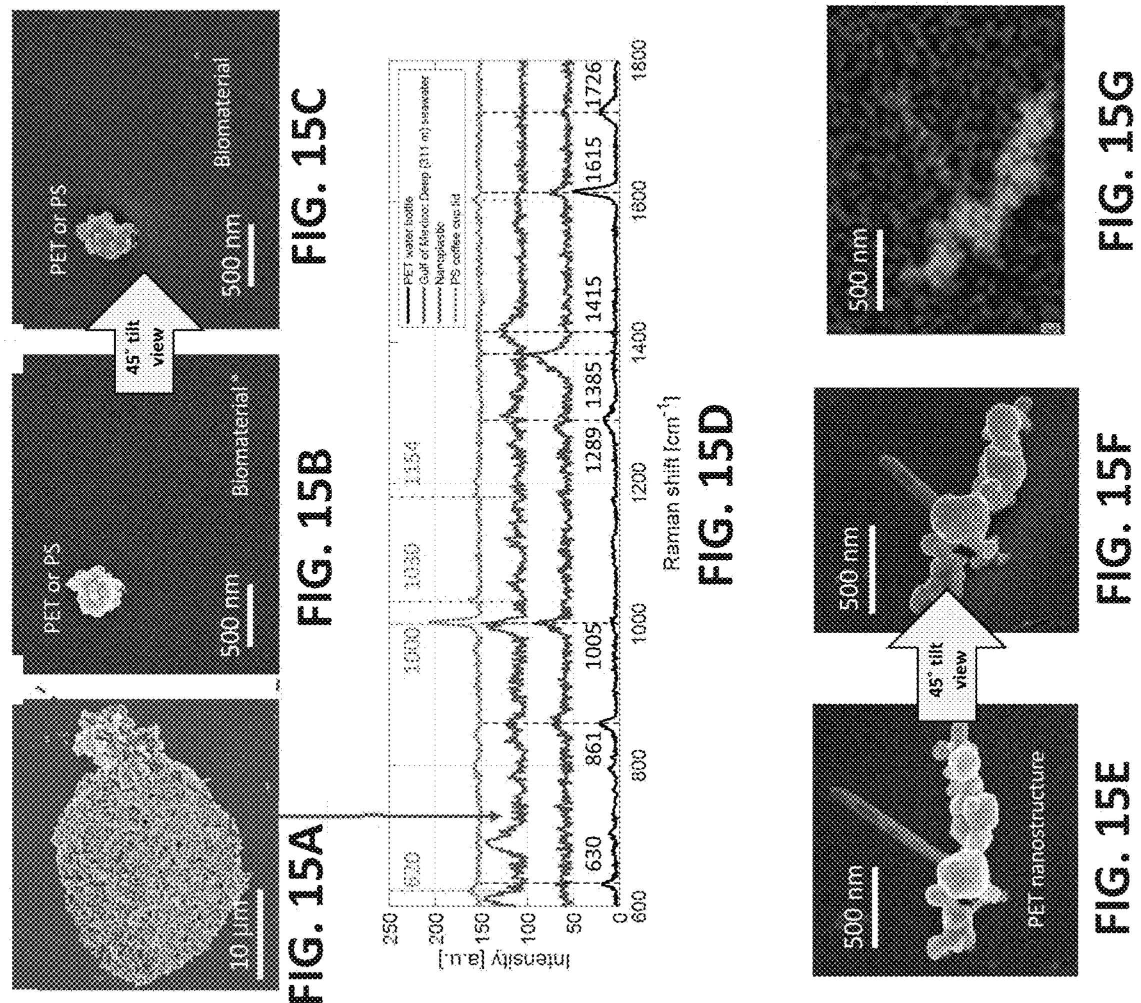
FIG. 15A is an SEM image of SSBD deposition spot from the 311 m-deep seawater sample from the Gulf of Mexico.
FIG. 15B is an exterior morphologies of a nanoplastic particle and a biomolecule. SEM images were taken after fully drying the sample for 2 weeks in the ambient condition.
FIG. 15C is the SEM sample stage was tilted at 45° to observe the morphological difference between the two materials.
FIG. 15D is a comparison of Raman spectra. Although the spectrum resembles the PET sample obtained from the Gulf of Mexico, it also contains some of the characteristics of PS, so it was classified as unidentified nanoparticles and can be a PET particle with PS oligomers attached to it.
FIG. 15E is a top view of another PET nanostructure from the Long Beach sample.
FIG. 15F is a tilted view of the sample in FIG. 15E.
FIG. 15G is an EDS carbon mapping of the sample in FIG. 15E.

Surprisingly, PET nanoplastics were also found in water samples from the offshore location in the Gulf of Mexico, which were collected from 311 m-deep under the water surface (blue spectrum in FIG. 14B and SEM in FIG. 14C). It has been reported that polyester is the dominant species among the microplastics found underwater in the sea, but it is the first time that PET nanoplastics, a type of polyester, is found there. The PET particles from the deep sea showed irregular shapes, unlike the ball-stick shape from the Long Beach and Jeju locations (FIG. 14A). Since the SSBD process was developed for bio-sensing without damaging molecules, the thermal process in SSBD is unlikely to melt the plastic particles or change their morphologies. In addition, the reference SSBD experiment on lab-synthesized PS NPs suspension showed the intact shapes of the spherical particles (FIG. 13). Therefore, the different morphologies of the PET particles found in different locations may be due to their different synthesis techniques or how they were fragmented from larger pieces.

What is claimed:

1. A method, comprising:

generating a thermal bubble on a surface of a substrate submerged in a medium having suspended particles such that the thermal bubble deposits the particles on the substrate; and deflating the thermal bubble to vanishing such that the deposited particles are pulled toward a central position to form an island of particles;

wherein the thermal bubble remains in the central position during the generating and deflating; and wherein the medium further comprises an analyte.

2. The method of claim 1, wherein the thermal bubble is generated by firing at least one laser.

3. The method of claim 1, wherein deflating the bubble comprises allowing the bubble to cool.

4. The method of claim 1, wherein the particles are nanoparticles.

5. The method of claim 4, wherein the particles are functionalized with biological molecules.

6. The method of claim 5, wherein the temperature around the bubble does not denature the biological molecules.

7. The method of claim 2, wherein the temperature of the bubble surface during the firing does not exceed 400 K.

8. The method of claim 1, wherein the medium is aqueous.

9. The method of claim 1, wherein air is dissolved in the medium.

10. The method of claim 1, further comprising incorporating the substrate into a chemical sensor.

11. The method of claim 1, wherein the particle is polystyrene beads, quantum dots, or noble metal nanoparticles.

12. The method of claim 1, wherein the deflating occurs on the order of hundreds of seconds.

13. The method of claim 1, wherein the generating and the deflating occurs over an array of bubbles simultaneously.

14. The method of claim 1, wherein the analyte is micro- or nano-plastics.

15. The method of claim 1, wherein the deflating to form the island of particles increases the density of particles more than 1000×.

* * * * *